US012466665B2

(12) United States Patent
Soundhararaj et al.

(10) Patent No.: US 12,466,665 B2
(45) Date of Patent: Nov. 11, 2025

(54) TRANSFER APPARATUSES, SYSTEMS, AND METHODS

(71) Applicant: INTELLIGRATED HEADQUARTERS, LLC, Mason, OH (US)

(72) Inventors: Aravind Raj Soundhararaj, Bengaluru (IN); Kishor Mujumdar, Bangalore (IN); Sharath Kumar K.S, Bengaluru (IN); Yogesh Prasad Singh, Nagpur (IN)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 0 days.

(21) Appl. No.: 18/169,589

(22) Filed: Feb. 15, 2023

(65) Prior Publication Data
US 2024/0270509 A1    Aug. 15, 2024

(51) Int. Cl.
*B65G 47/53* (2006.01)
(52) U.S. Cl.
CPC ................... *B65G 47/53* (2013.01)
(58) Field of Classification Search
None
See application file for complete search history.

(56) References Cited

U.S. PATENT DOCUMENTS

| | | | |
|---|---|---|---|
| 2,949,992 A | 8/1960 | Weinberg | |
| 5,160,017 A * | 11/1992 | Goodman | B65G 13/10 193/35 MD |
| 5,240,102 A | 8/1993 | Lucas | |
| 5,538,346 A * | 7/1996 | Frias | F16C 29/046 384/49 |
| 5,890,582 A * | 4/1999 | Mckinnon | B65G 39/025 198/781.04 |
| 8,474,596 B2 * | 7/2013 | Wolkerstorfer | B65G 13/10 198/370.09 |

(Continued)

FOREIGN PATENT DOCUMENTS

| | | |
|---|---|---|
| CN | 108163443 A | 6/2018 |
| EP | 1277675 A1 | 1/2003 |

(Continued)

OTHER PUBLICATIONS

Extended European Search Report Mailed on Jun. 19, 2024 for EP Application No. 24150797, 10 page(s).

(Continued)

*Primary Examiner* — Kavel Singh
(74) *Attorney, Agent, or Firm* — Alston & Bird LLP

(57) ABSTRACT

Apparatuses, systems, methods, and/or the like are provided for a transfer apparatus. An example transfer apparatus includes a bed having a first plurality of balls and a second plurality of balls having a first and second diameter, respectively, and wherein at least one of the first plurality of balls and at least one of the second plurality of balls are configured to rotate relative to the bed, wherein at least one belt of the plurality of belts is operably engaged with the at least one ball of the first plurality of balls or the at least one ball of the second plurality of balls; and a driver operably connected to the at least one belt of the plurality of belts, wherein the driver is configured to power the at least one belt of the plurality of belts.

18 Claims, 23 Drawing Sheets

(56) References Cited

U.S. PATENT DOCUMENTS

| | | | |
|---|---|---|---|
| 10,053,300 B2 * | 8/2018 | Itoh | B65G 15/12 |
| 10,793,364 B1 * | 10/2020 | Skarlupka | B65G 39/12 |
| 11,174,108 B1 * | 11/2021 | Skarlupka | B65G 39/12 |
| 2016/0023848 A1 | 1/2016 | Fourney | |

FOREIGN PATENT DOCUMENTS

| | | | |
|---|---|---|---|
| EP | 3196154 A1 | | 7/2017 |
| JP | S5457758 A | | 5/1979 |
| JP | 2010-076863 A | | 4/2010 |
| KR | 20150107044 A | * | 9/2015 |
| KR | 10-2015-0128183 A | | 11/2015 |
| KR | 10-2015-0128442 A | | 11/2015 |
| KR | 10-2015-0144919 A | | 12/2015 |
| KR | 10-1740945 B1 | | 5/2017 |

OTHER PUBLICATIONS

EP Office Action Mailed on Jun. 5, 2025 for EP Application No. 24150797, 9 page(s).

* cited by examiner

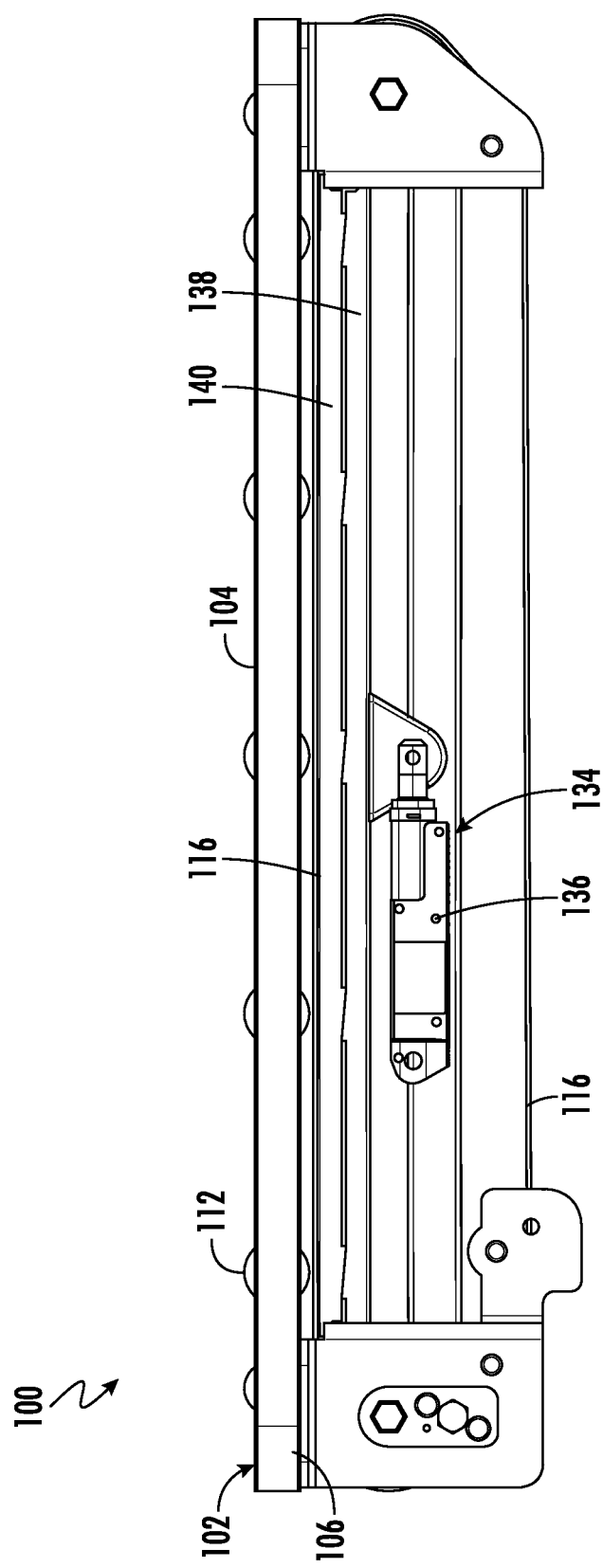

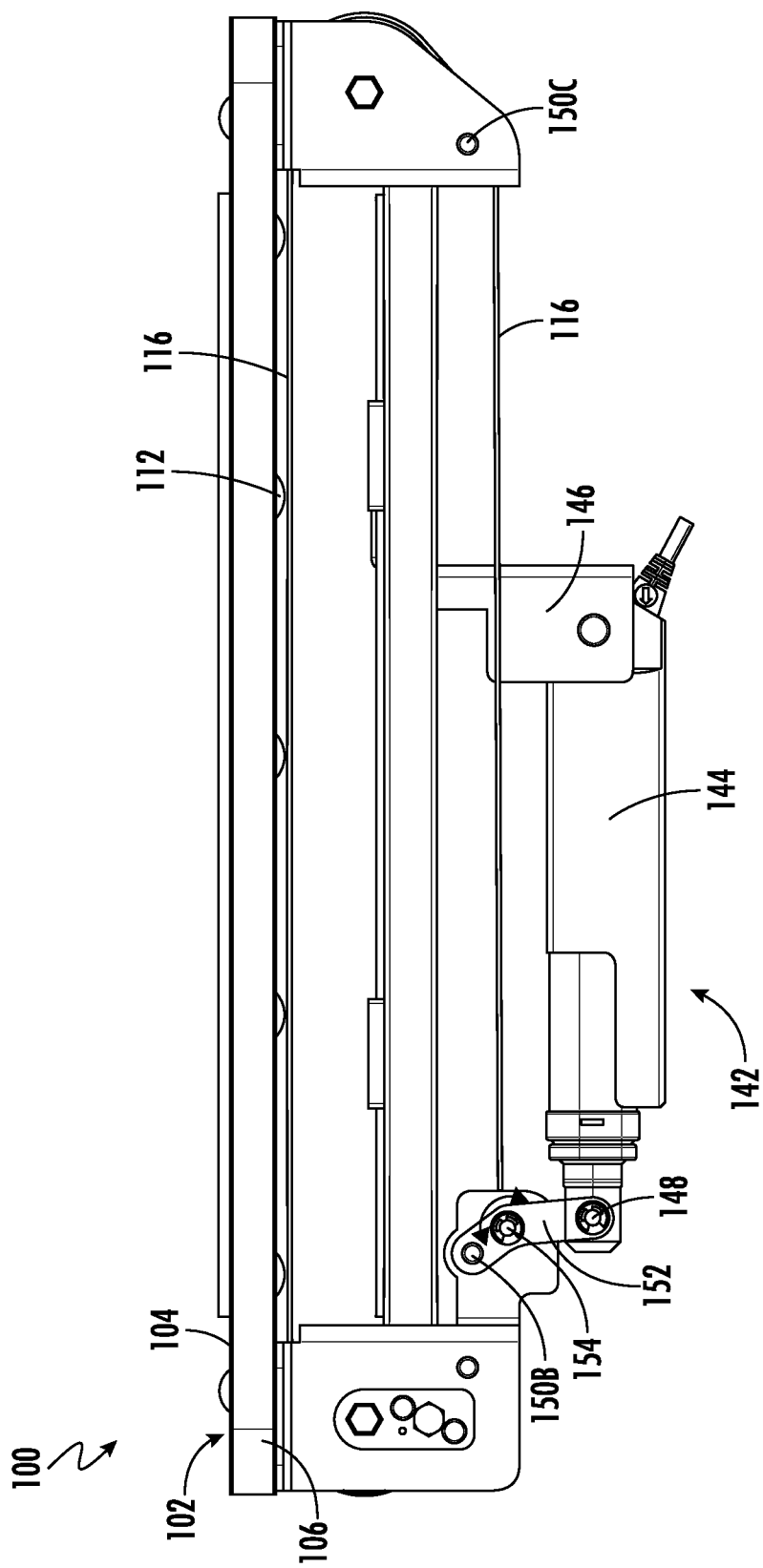

TRANSFER APPARATUSES, SYSTEMS, AND METHODS

TECHNICAL FIELD

The present disclosure relates generally to divert systems, and more particularly, in some examples, to using transfer systems for diverting one or more objects between one or more conveyors.

BACKGROUND

In industrial environments, transport systems such as conveyors may be used to support and move one or more objects around the environment (e.g., a warehouse, a distribution center, a sorting center, etc.). A conveyor system may include multiple conveyors transporting objects in multiple directions. In some examples, the various conveyors of the conveyor system may be interconnected. Connected conveyors may be used to create an increased number of directions by which the one or more objects may be transported by the conveyor system.

Transfer apparatuses, in some examples, may be implemented in conveyor systems to facilitate transfer between two or more conveyors. One or more of the objects transported by the conveyor system may be transferred (e.g., diverted, redirected, etc.) by the transfer apparatus from a first conveyor traveling in a first direction to a second connected conveyor traveling in a second direction, different from the first. For example, the first conveyor may be traveling in a first direction and the second conveyor may be traveling in a second direction that is perpendicular (i.e., 90 degrees) to the first direction, and the first and second conveyors may intersect at the transfer apparatus. Transfer apparatuses, in some examples, may use various forced movement devices, such as balls, to transfer one or more objects from one conveyors to another (e.g., from the first conveyor to the second conveyor) at the intersection point (e.g., where the transfer apparatus is disposed).

Through applied effort, ingenuity, and innovation, Applicant has solved problems relating to transfer apparatuses by developing solutions embodied in the present disclosure, which are described in detail below.

SUMMARY

In general, embodiments of the present disclosure provide systems, apparatuses, methods and/or the like for a transfer system.

In accordance with various embodiments of the present disclosure, there is provided a transfer apparatus including a bed. In some embodiments, the bed includes a first plurality of balls, each ball of the first plurality of balls having a first diameter, wherein at least one ball of the first plurality of balls is configured to rotate relative to the bed. In some embodiments, the bed includes a second plurality of balls, each ball of the second plurality of balls having a second diameter, wherein at least one ball of the second plurality of balls is configured to rotate relative to the bed. In some embodiments, the transfer apparatus includes a plurality of belts, wherein at least one belt of the plurality of belts is operably engaged with the at least one ball of the first plurality of balls or the at least one ball of the second plurality of balls. In some embodiments, the transfer apparatus includes a driver operably connected to the at least one belt of the plurality of belts, wherein the driver is configured to power the at least one belt of the plurality of belts.

In some embodiments, the driver is a motor-driven roller.

In some embodiments, the at least one belt of the plurality of belts is an elastomer strip belt.

In some embodiments, the second diameter is greater than the first diameter.

In some embodiments, the at least one ball of the first plurality of balls is a plastic ball.

In some embodiments, the transfer apparatus includes a plurality of pulleys, wherein at least one pulley of the plurality of pulleys is operably engaged with the at least one belt of the plurality of belts.

In some embodiments, the at least one pulley of the plurality of pulleys includes at least one actuator, and the at least one actuator is configured to adjust a tension of the at least one belt of the plurality of belts.

In some embodiments, the bed is a fixed bed having a top surface and a bottom surface. In some embodiments, the first diameter of the at least one ball of the first plurality of balls defines a first distal end located above the top surface and a first proximal end located below the bottom surface. In some embodiments, the second diameter of the at least one ball of the second plurality of balls defines a second distal end located above the top surface and a second proximal end located below the bottom surface. In some embodiments, the first distal end and the second distal end are located on a first, shared plane above and parallel to the top surface. In some embodiments, the first proximal end is located on a second plane below and parallel to the bottom surface, and the second proximal end is located on a third plane below and parallel to the bottom surface.

In some embodiments, the plurality of belts is a first plurality of belts aligned along a first axis. In some embodiments, the transfer apparatus further includes a second plurality of belts aligned along a second axis. In some embodiments, at least one belt of the first plurality of belts is operably engaged with the at least one ball of the first plurality of balls, and at least one belt of the second plurality of belts is operably engaged with the at least one ball of the second plurality of balls.

In some embodiments, the driver is a first driver, and the transfer apparatus further includes a second driver operably connected to the at least one belt of the second plurality of belts. In some embodiments, the first driver is configured to power the at least one belt of the first plurality of belts, and the second driver is configured to power the at least one belt of the second plurality of belts.

In some embodiments, the first axis is perpendicular to the second axis, and the first driver is perpendicular to the at least one belt of the first plurality of belts and the second driver is perpendicular to the at least one belt of the second plurality of belts.

In some embodiments, the first driver is configured to drive the at least one belt of the first plurality of belts such that the at least one ball of the first plurality of balls rotates at a first speed $N_1$, and the second driver is configured to drive the at least one belt of the second plurality of belts such that the at least one ball of the second plurality of balls rotates at a second speed $N_2$.

In some embodiments, the first driver and the second driver are configured to drive the at least one belt of the first plurality of belts and the at least one belt of the second plurality of belts such that:

$$N_1 = N_2,$$
$$N_1 > N_2, \text{ or}$$
$$N_1 < N_2.$$

According to various embodiments, there is provided a transfer system including a first conveyor configured to transport one or more objects in a first flow path aligned along the first conveyor. In some embodiments, the transfer system includes a second conveyor configured to transport the one or more objects in a second flow path aligned along the second conveyor. In some embodiments, the transfers system includes a transfer apparatus configured to do one or more of: divert a first flow of the one or more objects from the first flow path of the first conveyor to the second flow path of the second conveyor, or divert a second flow of the one or more objects from the second flow path of the second conveyor to the first flow path of the first conveyor. In some embodiments, the transfer apparatus includes a bed including a first plurality of balls, each ball of the first plurality of balls having a first diameter. In some embodiments, at least one ball of the first plurality of balls is configured to rotate relative to the bed. In some embodiments, the transfer apparatus includes a second plurality of balls, each ball of the second plurality of balls having a second diameter. In some embodiments, at least one ball of the second plurality of balls is configured to rotate relative to the bed. In some embodiments, the transfer apparatus includes a plurality of belts, wherein at least one belt of the plurality of belts is operably engaged with the at least one ball of the first plurality of balls or the at least one ball of the second plurality of balls. In some embodiments, the transfer apparatus includes a driver operably connected to the at least one belt of the plurality of belts, wherein the driver is configured to power the at least one belt of the plurality of belts.

In some embodiments, the transfer system includes an intersection point wherein the first conveyor intersects the second conveyor, and wherein the transfer apparatus is disposed at the intersection point.

In some embodiments, the first flow path and the second flow path define an angle between them, the angle ranging between 15 and 45 degrees.

In some embodiments, the transfer system includes a third conveyor configured to transport the one or more objects in a third flow path aligned along the third conveyor.

In some embodiments, the first flow path and the second flow path define a first angle between them, the first angle ranging between 15 and 45 degrees, and wherein the first flow path and the third flow path define a second angle between them, the second angle ranging between 45 and 90 degrees.

According to various embodiments, there is provided a method of using a transfer apparatus. In some embodiments, the method includes a step of driving, by a first roller, at least one belt of a first plurality of belts operably engaged with at least one ball of a first plurality of balls, such that the at least one ball rotates at a first speed relative to a fixed bed. In some embodiments, the method includes a step of driving, by a second roller, at least one belt of a second plurality of belts operably engaged with at least one ball of a second plurality of balls, such that the at least one ball rotates at a second speed relative to the fixed bed. In some embodiments, the methods includes a step of diverting, by one or more of the at least one ball of the first plurality of balls and the at least one ball of the second plurality of balls, one or more objects traveling along a first flow path along a first conveyor to a second flow path along a second conveyor.

In some embodiments, the method further includes adjusting, by at least one pulley of a plurality of pulleys operably connected to the at least one belt of the first plurality of belts, a tension of the at least one belt of the first plurality of belts.

The above summary is provided merely for purposes of summarizing some example embodiments to provide a basic understanding of some embodiments of the disclosure. Accordingly, it will be appreciated that the above-described embodiments are merely examples. It will be appreciated that the scope of the disclosure encompasses many potential embodiments in addition to those here summarized, some of which will be further described below.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

FIG. 5A is a side elevation view of an example transfer apparatus including an example sliding wedge mechanism in accordance with various embodiments of the present disclosure;

FIG. 6B is a side elevation view of an example transfer apparatus including an example belt tensioning mechanism in accordance with various embodiments of the present disclosure;

DETAILED DESCRIPTION OF SOME EXAMPLE EMBODIMENTS

Figure 1A:
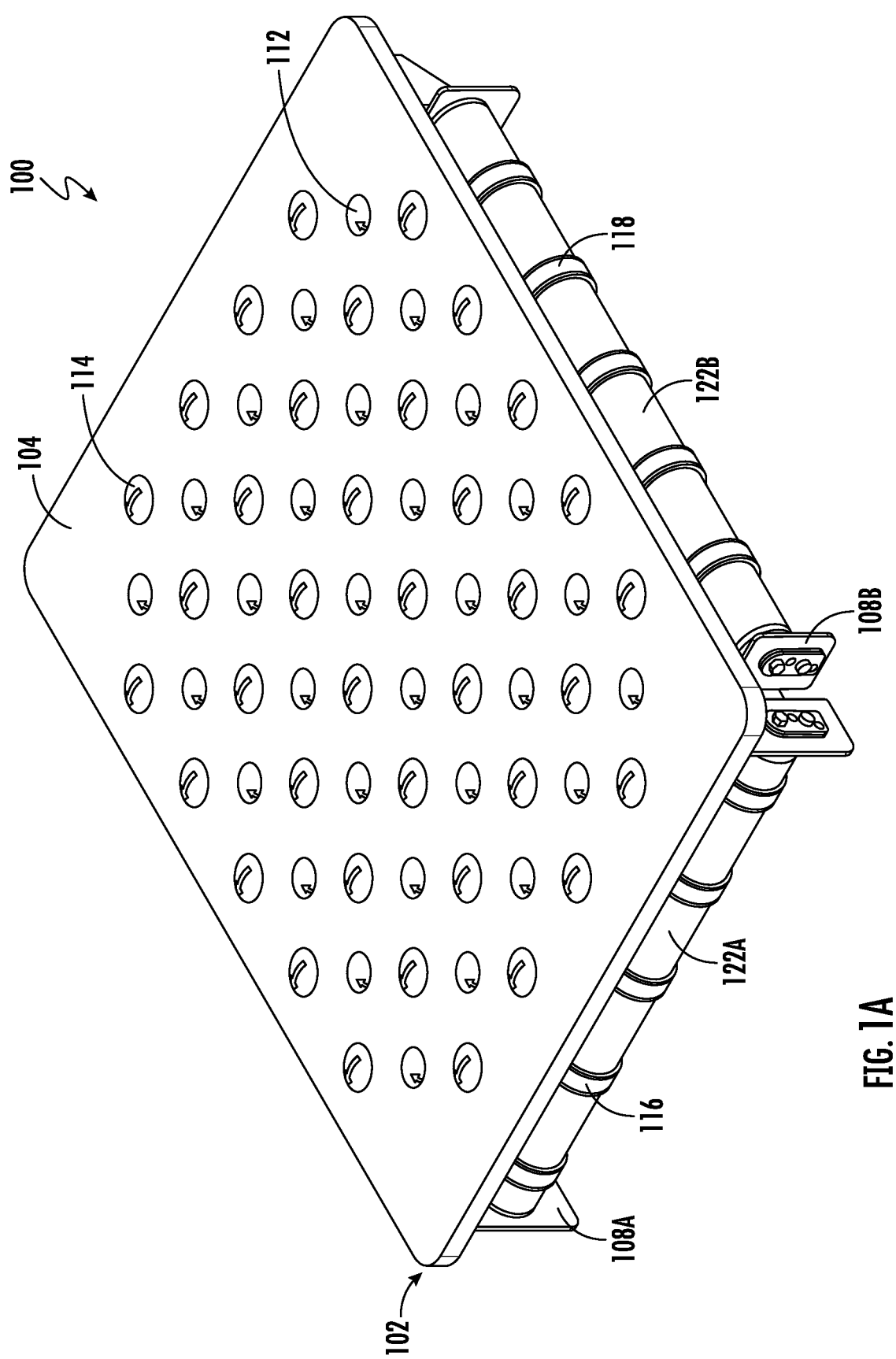
FIG. 1A is a top perspective view of a transfer apparatus in accordance with various embodiments of the present disclosure.

Various embodiments of the present disclosure now will be described more fully hereinafter with reference to the accompanying drawings, in which some, but not all embodiments of the disclosure are shown. Indeed, this disclosure may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers may refer to like elements throughout. The phrases "in one embodiment," "according to one embodiment," and/or the like generally mean that the particular feature, structure, or characteristic following the phrase may be included in at least one embodiment of the present disclosure and may be included in more than one embodiment of the present disclosure (importantly, such phrases do not necessarily may refer to the same embodiment).

Overview

In environments such as distribution centers, warehouses, and/or the like, objects may be transported using one or more conveyor, which may include multiple conveyors for transporting various objects. Some conveyor systems may include overlapping conveyors, each of which may be configured to transport objects in different directions.

According to various embodiments and in some examples, there is provided a transfer apparatus having a bed including a first plurality of balls and a second plurality of balls. In some embodiments, the first and second plurality of balls may be embedded within one or more slots of the bed. In some embodiments, the bed may be a fixed bed, and the first and second plurality of balls may rotate relative to the fixed bed; that is, the balls may rotate within slots fixed within the bed. In some embodiments, the rotation of the balls may be driven by a plurality of belts operably connected to one or more drivers. In some embodiments, the belts may be elastomer strip belts operably engaged with the balls and operably connected to the one or more drivers.

In some embodiments, the first and second plurality of balls may have different diameters and may be disposed within the fixed bed such that they rotate within the same plane above the fixed bed and rotate in different planes below or otherwise proximate the fixed bed. In some embodiments, the plurality of belts may include a first plurality of belts aligned along a first axis and a second plurality of belts aligned along a second axis. The first and second axes may be perpendicular to each other. In some embodiments, the first plurality of belts aligned along the first axis may be operably engaged with the first plurality of balls while the second plurality of belts aligned along the second axis may be operably engaged with the second plurality of balls simultaneously without intersection between the belts.

In some embodiments, a first driver may be operably connected to the first plurality of belts and a second driver may be operably connected to the second plurality of belts. In some embodiments, the first driver may drive the first plurality of belts at a first speed causing the first plurality of belts to rotate at a first speed and, by extension, causing the first plurality of balls to rotate at a first speed. Similarly, the second driver may drive the second plurality of belts at a second speed causing the second plurality of belts to rotate at a second speed and, by extension, causing the second plurality of balls to rotate at a second speed. Alternatively or additionally, one driver may rotate while the other is held stationary.

In other embodiments, the transfer apparatus may include one or more pulleys that are engaged with one or more of the first or second plurality of belts. In some embodiments, the one or more pulleys may include one or more actuators that are configured to adjust the tension of one or more of the first or second plurality of belts. In some embodiments, the pulleys may loosen the first and/or the second plurality of belts such that they are no longer engaged with the first or second plurality of balls.

In some embodiments, the transfer apparatus may be integrated into a conveyor system having two or more conveyors transporting one or more objects in two or more directions. For example, a first conveyor may transport one or more objects in a first direction and a second conveyor may transport one or more objects in a second direction. In some embodiments, the transfer apparatus may be configured to divert the flow of the one or more objects from traveling along the first direction on the first conveyor to the second direction on the second conveyor. For example, the transfer apparatus may be positioned at a point where the first conveyor intersects or otherwise abuts the second conveyor.

In some examples, increasing the number of directions in which the transfer apparatus can transfer the one or more objects may lead to corresponding increases in the efficiency of the example conveyor systems in which the transfer apparatus is implemented. For example, it would greatly increase efficiency for a conveyor system to implement a transfer apparatus that could transfer one or more objects from not only an example first conveyor to an example second conveyor traveling perpendicular to the first conveyor, but also to an example third conveyor traveling at a forty-five degree angle to the first conveyor's direction, as well as to an example fourth conveyor traveling at a thirty-degree angle to the first conveyor's direction, and so on for as many conveyors and as many directions as desired.

In some examples, the speed at which the first and second plurality of balls rotate may be manipulated such that the one or more objects are diverted from the first conveyor to the second conveyor. For example, and as will be described in more detail later in this disclosure with reference to the figures, one or more objects may be traveling in a first direction along a first conveyor; the transfer apparatus may be disposed at a location where the first conveyor intersects a second conveyor at, for example, a 90 degree angle; when the one or more objects reach the transfer apparatus, the first driver may drive the first plurality of belts causing the first plurality of balls to rotate perpendicular to the first conveyor and parallel to the second conveyor; the second driver may be held stationary such that the second plurality of balls do not rotate; and, in at least this way, the one or more objects may be transferred by the rotating first plurality of balls from the first conveyor to the second conveyor. As another example, when the second conveyor intersects the first conveyor at a 45 degree angle, the first plurality of balls may be rotated by the first driver at a first speed and the second plurality of balls may be rotated by the second driver at a second speed equal to the first speed, causing the one or more objects to divert from the first conveyor to the second conveyor.

Example Transfer Apparatuses

FIG. 1A shows a top perspective view of example transfer apparatus 100. In some embodiments, the transfer apparatus 100 may have a bed 102. In some embodiments, the bed 102 may have a top surface 104 and a bottom surface 106 (as seen in at least FIG. 2A, which shows a bottom perspective view of the example fixed bed ball transfer apparatus 100). In some embodiments, the bed 102 may be rectangular-shaped and may be substantially planar on its top 104 and bottom 106 surfaces. However, the bed 102 may be defined by a variety of shapes and dimensions. In some embodiments, the bed 102 may be composed of metal, such as aluminum or steel.

Figure 2A:
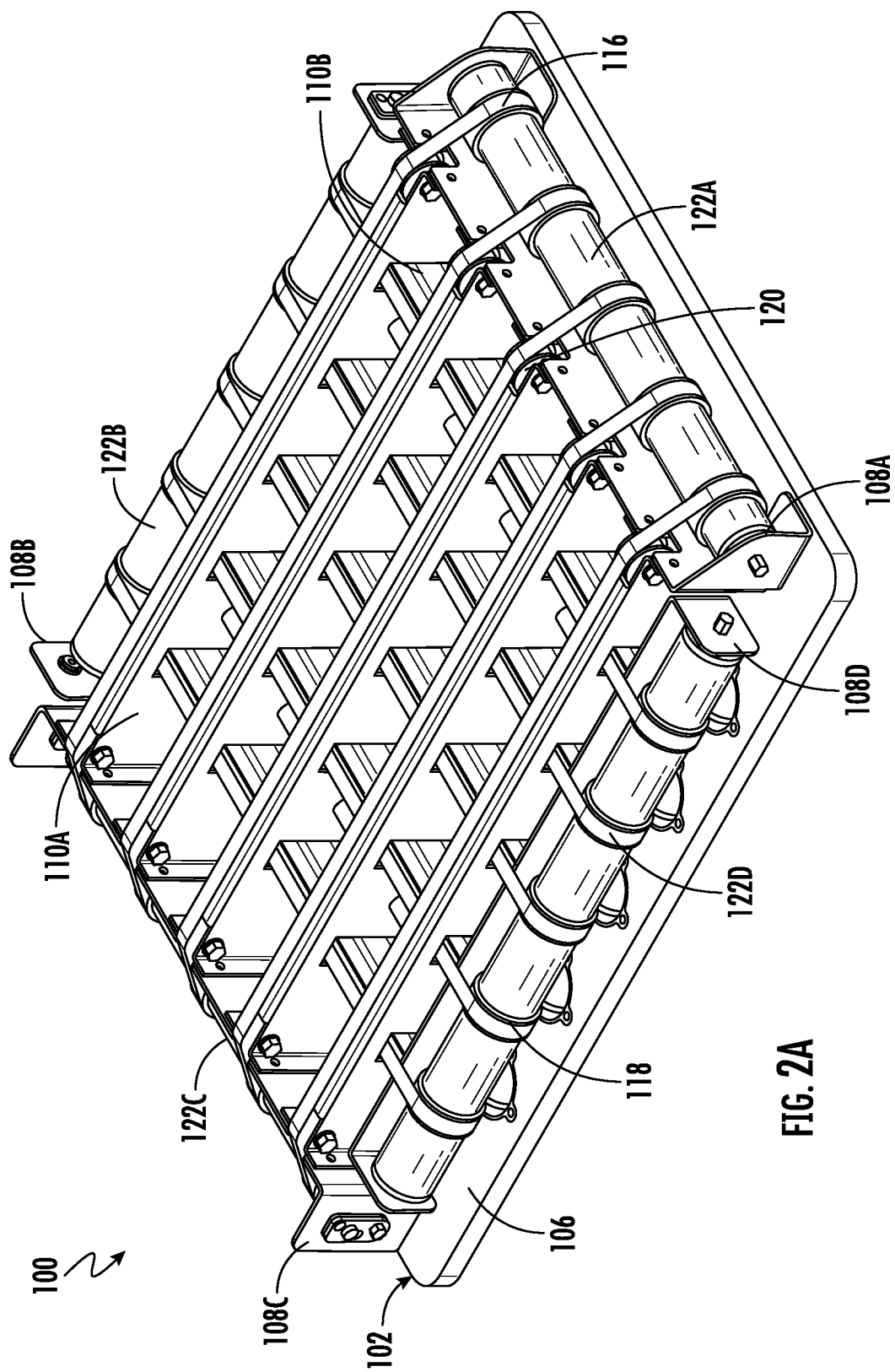
FIG. 2A is a bottom perspective view of an example transfer apparatus in accordance with various embodiments of the present disclosure.

In some embodiments, and as shown in at least FIG. 2A, the bed 102 may include one or more bracketing 108A-D. In some embodiments, the bracketing 108A-D may be disposed on the bottom surface 106 and positioned along the edges of the bed 102. In some embodiments, and as will be described in greater detail later in this disclosure, the bracketing 108A-D may be used to fixedly attach one or more drivers to the bed 102.

In some embodiments, the bed 102 may include one or more first aligners 110A positioned on the bottom surface 106 and aligned along in first axis and one or more aligners 110B, also positioned on the bottom surface 106 but aligned along a second axis. In some embodiments, the first and second axes may be perpendicular to one another. In some embodiments, the aligners 110A, 110B may be fixedly attached to one or more of the bracketing 108A-D. In some embodiments, and as will be described in greater detail later in this disclosure, the aligners 110A, 110B may be used to fixedly attach at least one belt to the bed 102.

In some embodiments, the bed 102 may be configured to fit within a conveyor system having one or more conveyors. In some embodiments, the bed 102 may be positioned at an intersection point of one or more conveyors within a conveyor system, as will be described in greater detail later in this disclosure.

Figure 1B:
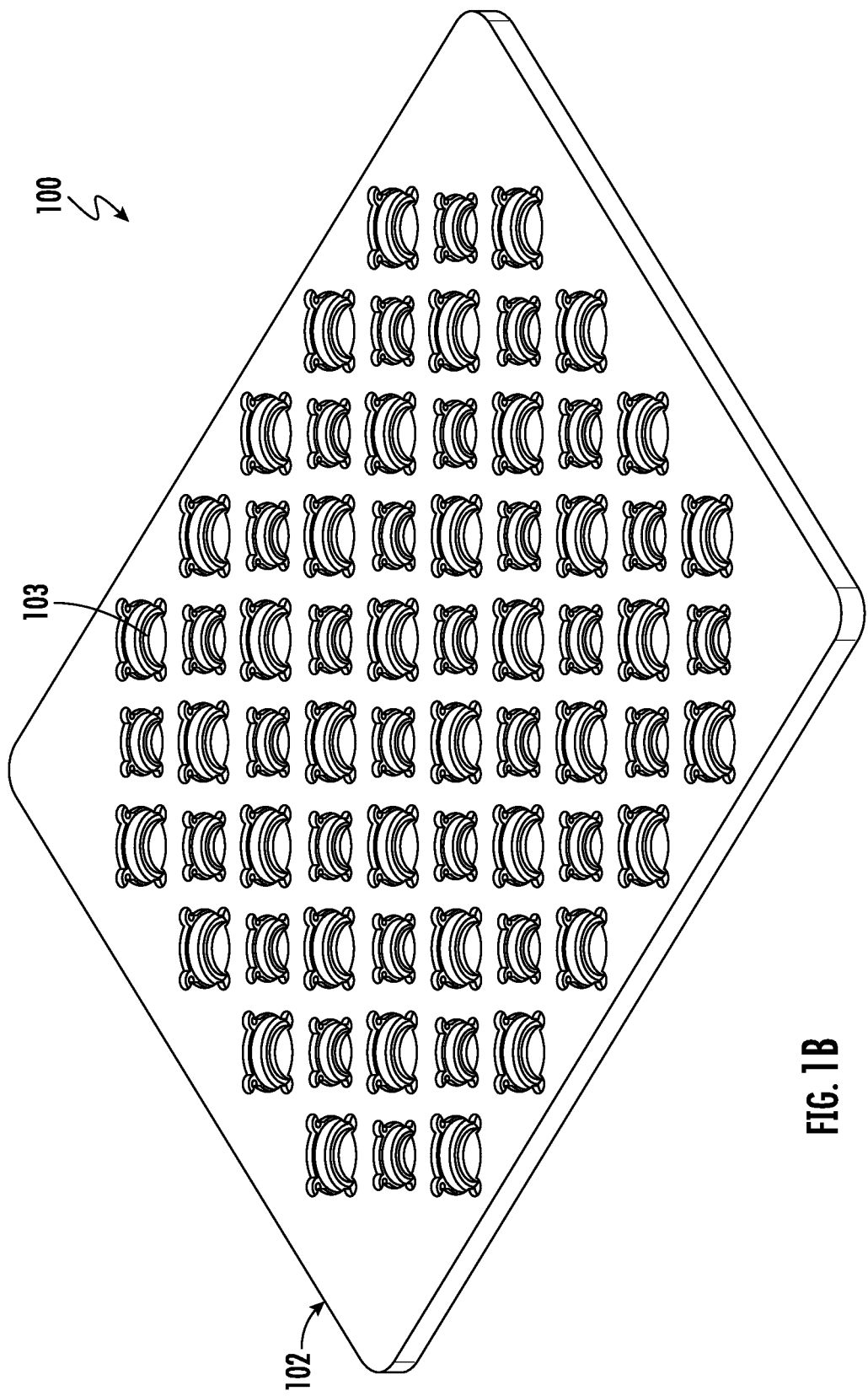
FIG. 1B is a top perspective view of an example bed of a transfer apparatus in accordance with various embodiments of the present disclosure.
Figure 1C:
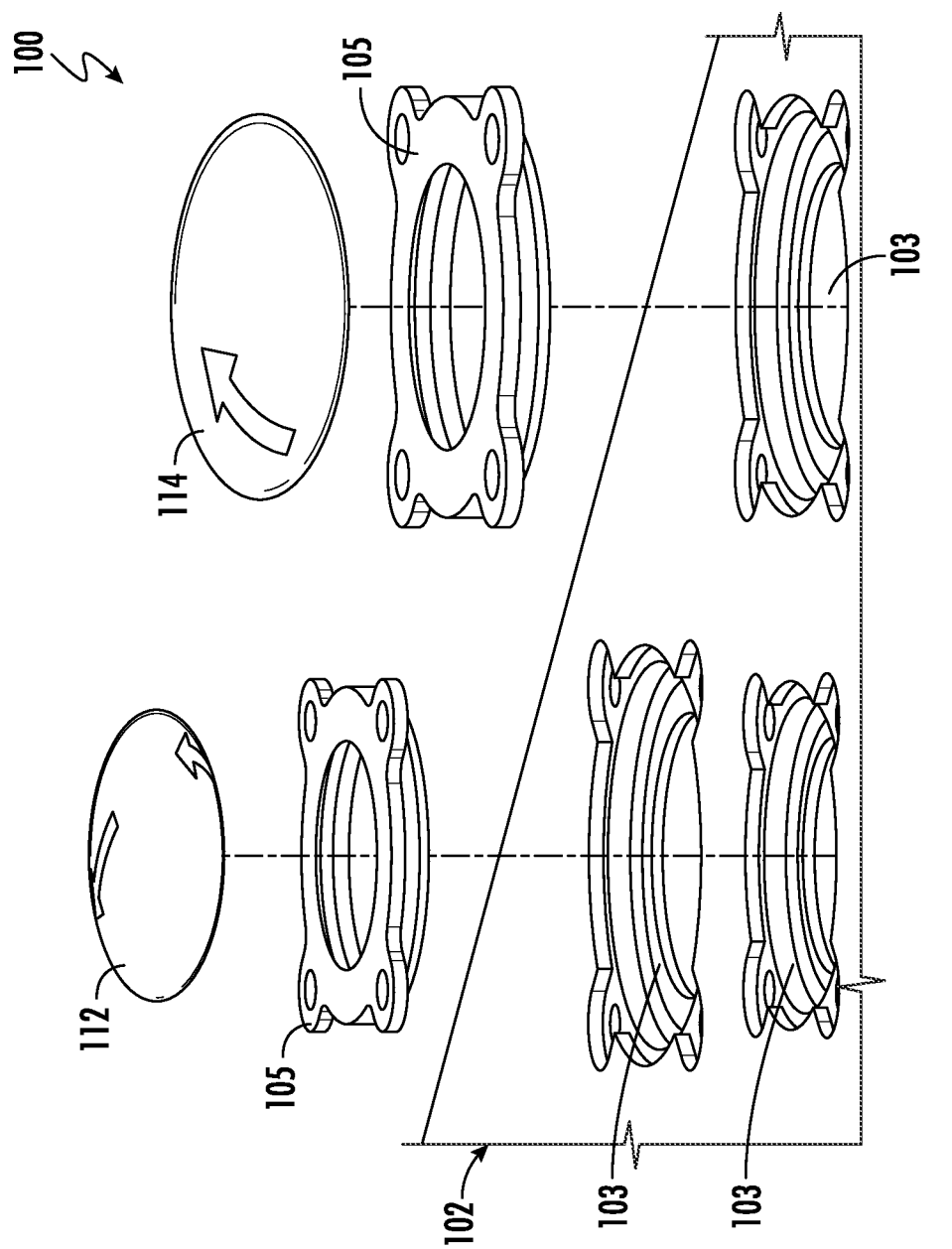
FIG. 1C is an exploded view of an example transfer apparatus in accordance with various embodiments of the present disclosure.

In some embodiments, the bed 102 may be configured to include and/or to hold (e.g., with one or more slots or grooves 103, as shown in at least FIGS. 1B and 1C) a first plurality of balls 112 and a second plurality of balls 114. In some embodiments, the first and second plurality of balls 112, 114 may be secured by one or more washers 105, as shown in at least FIG. 1C. In some embodiments, the washers 105 may be disposed between the balls 112, 114 and the slots/grooves 103 to provide, among other things, protection from wear and friction on the balls 112, 114. In some embodiments, the first plurality of balls 112 and the second plurality of balls 114 may be configured to rotate relative to the bed 102 such that one of more objects supported by the bed 102 may be moved or otherwise urged by the rotation of the first and second plurality of balls 112, 114. In some embodiments, the first plurality of balls 112 and the second plurality of balls 114 may have respective arrows on their surfaces that indicate their respective directions of rotation. However, in some embodiments, the first plurality of balls 112 and second plurality of balls 114 may rotate both in the direction of their respective arrows and in the opposite direction of their respective arrows, or in any direction as necessary for the apparatus 100. The means by which the first and second plurality of balls may be rotated according to various embodiments will be described in greater detail later in this disclosure. In some embodiments, the first and second plurality of balls 112, 114 may be plastic balls having a friction coating and/or a wear-resistant coating. In other embodiments, the first and second plurality of balls 112, 114 may be composed of other materials (e.g., one or more metals or composites).

Figure 1D:
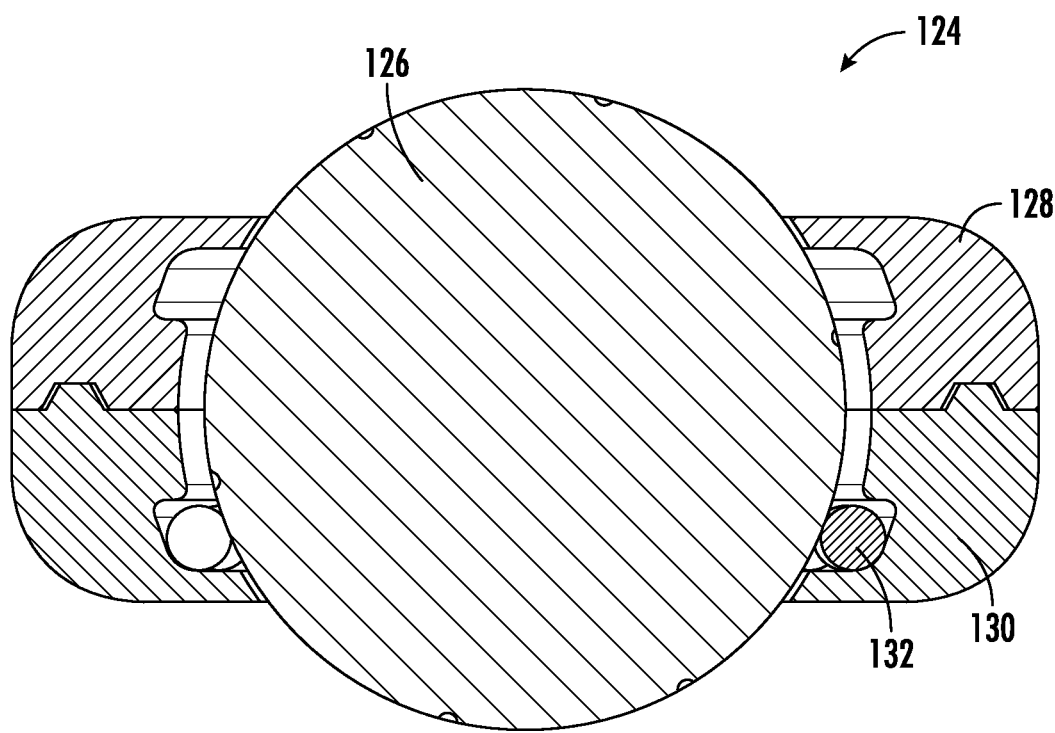
FIG. 1D is side, cross-sectional, elevation view of an example ball of an example transfer apparatus in accordance with various embodiments of the present disclosure.
Figure 1E:
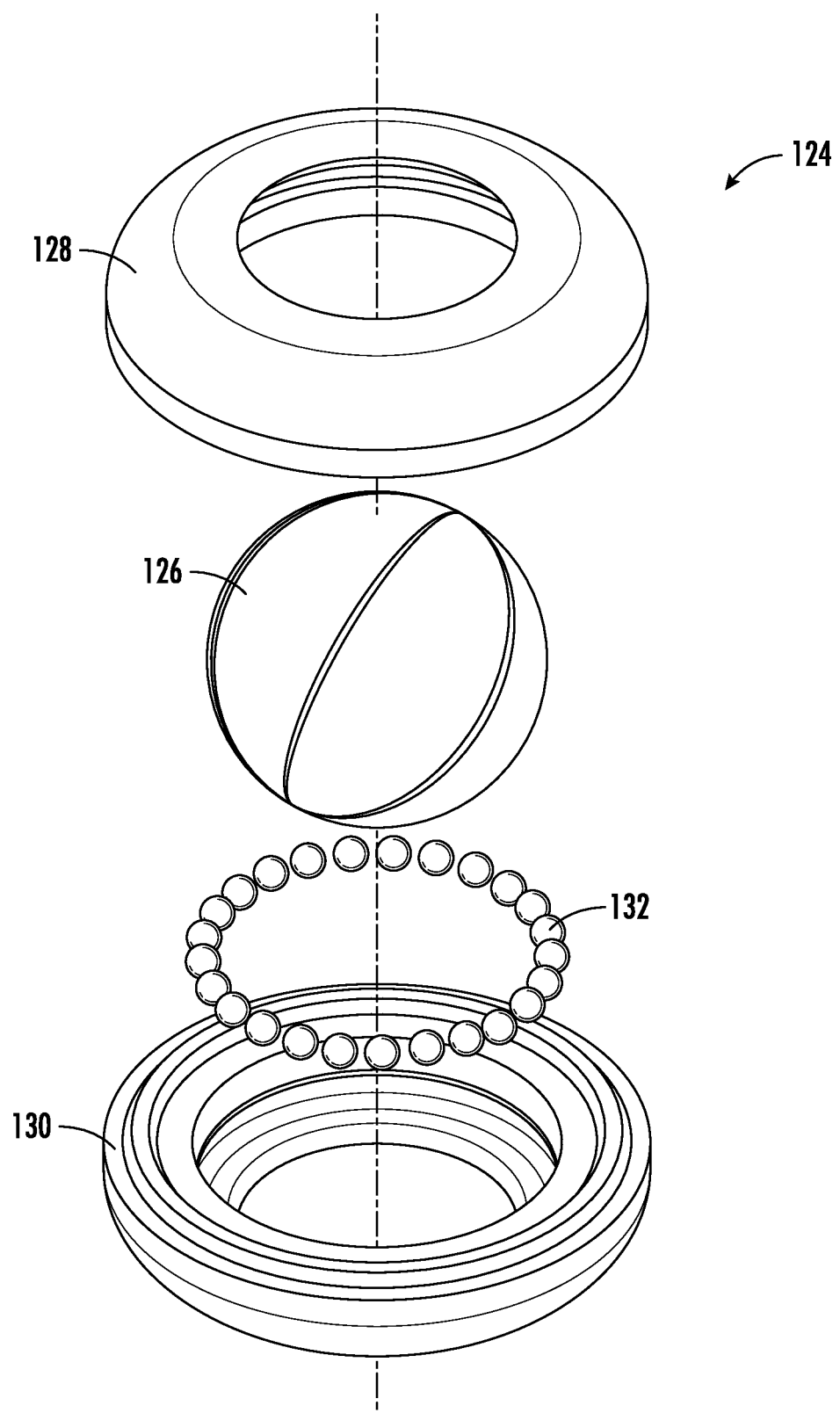
FIG. 1E is an exploded view of an example ball of an example transfer apparatus in accordance with various embodiments of the present disclosure.

In some embodiments, and as shown in at least FIGS. 1D and 1E, one or more of the first plurality of balls 112 and the second plurality of balls 114 may be a modular cartridge 124. In some embodiments, the modular cartridge 124 may include a transfer ball 126 (e.g., one or more of the balls of the first and second plurality of balls 112, 114). In some embodiments, the characteristics and features of the previously-described first and second plurality of balls 112, 114 may similarly apply to the transfer ball 126. In some embodiments, the modular cartridge 124 may include a top race 128 and a bottom race 130. In some embodiments, the top race 128 and bottom race 130 may be configured to interlock and form a secure connection to each other (e.g., via interlocking slots and grooves). In some embodiments, the top race 128 and bottom race 130 may interlock and form a pocket around the ball 126 such that the transfer ball 126 is enclosed by and secured between the top race 128 and bottom race 130 but still capable of rotating within the pocket formed by the top race 128 and bottom race 130. In some embodiments, the modular cartridge 124 may include one or more balls for low friction movement 132. In some embodiments, these one or more balls for low friction movement 132 may be disposed within one more slots or grooves of the top race 128 and/or bottom race 130. In some embodiments, the one or more balls for low friction movement 132 may be substantially flush with the spherical transfer ball 126 and configured to reduce friction when the transfer ball 126 rotates. Although FIGS. 1D and 1E show the one or more balls for low friction movement 132 as disposed within the bottom race 130, the one or more balls for low friction movement 132 may also be disposed in the top race 128, or in the top race 128 and the bottom race 130. In some embodiments, the one or more balls for low friction movement 132 may be composed of plastic, metal, or a composite material. In some embodiments, the one or more balls for low friction movement 132 may be the same material as the transfer ball 126, while in other embodiments the one or more balls for low friction movement 132 may be composed of a different material than the transfer ball 126.

Figure 1F:
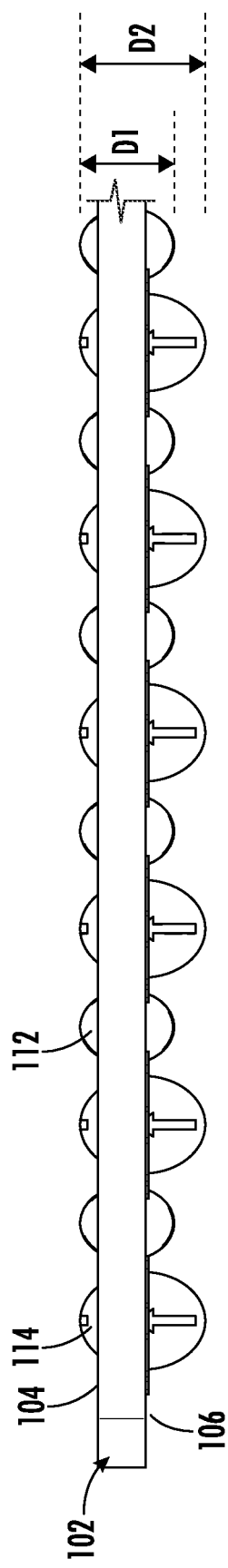
FIG. 1F is a side elevation view of an example transfer apparatus in accordance with various embodiments of the present disclosure.

In some embodiments, and as shown in FIG. 1F, the first plurality of balls 112 may have a first diameter $D_1$ and the second plurality of balls 114 may have a second diameter $D_2$. In some embodiments, the second diameter $D_2$ may be greater than the first diameter $D_1$, but in other embodiments the first diameter $D_1$ may be greater than the second diameter $D_2$ or, in yet further examples, the first and second diameters $D_1$, $D_2$ may be equal. In some embodiments the first and second diameters $D_1$, $D_2$ may range between 1 inches and 3 inches. In some embodiments, and as shown in at least FIG. 1A, the first and second plurality of balls 112, 114 may rotate within a shared plane parallel to and above the top surface 104 of the bed 102. In at least this way, one or more objects supported by the transfer apparatus 100 may come into contact simultaneously with balls from the first plurality of balls 112 and the second plurality of balls 114. However, in other embodiments, the first and second plurality of balls 112, 114 may rotate in different planes beneath (that is, below the bottom surface 106) or otherwise proximate to the bottom surface 106 of the bed 102. This will be described in greater detail later in the disclosure. In some examples, the aforementioned rotational arrangement may be described geometrically with reference to the respective diameters of the first and second plurality of balls 112, 114. It can also be seen particularly in FIG. 1D and also in at least FIGS. 3B, 3C, 4B, and 4C.

The first diameter $D_1$ of the first plurality of balls 112 may have a first distal end above the top surface 104 of the bed 102 and a first proximal end below the bottom surface 106 of the bed 102; similarly, the second diameter $D_2$ of the second plurality of balls 114 may have a first distal end above the top surface 104 of the bed 102 and a second proximal end below the bottom surface 106 of the bed 102. While the first and second distal ends may be disposed within a shared plane that is parallel to the top surface 104 of the bed 102, the first and second proximal ends may not be disposed within a shared plane but instead disposed within different, parallel but non-coplanar planes, each parallel not only to each other but also to the bottom surface 106 of the bed 102.

In some embodiments, the first plurality of balls 112 and the second plurality of balls 114 may be positioned in alternating rows within the bed 102. In some embodiments, a row of a plurality of first or second balls 112, 114 may include a number of balls ranging from two to 10 balls. In some embodiments, rows having balls from the second plurality of balls 114 may have varying numbers of balls (e.g., one row having four, another having five, and still another having six) while rows having balls from the first plurality of balls 112 may have the same number of balls. For example, as shown in at least FIG. 1A, a first row has four balls from the second plurality of balls 114, a second row has five balls from the first plurality of balls 112, a third row has six balls from the second plurality of balls 114, and a fourth row also have five balls from the first plurality of balls 112.

Referring now to FIGS. 3A-4C, in some embodiments, the transfer apparatus 100 may include a plurality of belts, which may include a first plurality of belts 116 and a second plurality of belts 118. In some embodiments, the first plurality of belts 116 may be operably engaged with the first plurality of balls 112 and the second plurality of belts 118 may be operably engaged with the second plurality of balls 114. This operable engagement may occur with the "tops" of the respective belts 116, 118 with the "bottoms" of the respective balls below the bottom surface 106 of the bed 102. This can be seen in particular in at least FIGS. 3A and 3B. That is, in some embodiments, the first plurality of belts 116 may transfer motion to the first plurality of balls 112 and the second plurality of belts 118 may transfer motion to the second plurality of balls 114 when the respective belts and balls are operably engaged. In some embodiments, the first and second plurality of belts 116, 118 may be strip belts composed of an elastomer.

In some embodiments, the first and second plurality of belts 116, 118 may be positioned beneath the bottom surface 106 of the bed 102. In some embodiments, the first plurality of belts 116 may be attached to the first aligners 110A while the second plurality of belts 118 may be attached to the second aligners 110B. In some embodiments, the first and second plurality of belts 116, 118 may be configured to operably engage with the respective bottoms of the first plurality of balls 112 and the second plurality of balls 114. That is, while the balls 112, 114 may be rotating relative to the bed 102, their bottoms stay in continuous contact with the respective first plurality of belts 116 and second plurality of belts 118. In at least this way, the first and second plurality of belts 116, 118 may remain operably engaged with the first and second plurality of balls 112, 114 and continuously transfer motion. In some embodiments, the transfer of motion between the first plurality of belts 116 and the first plurality of balls 112 and the second plurality of belts and the second plurality of balls 114 may be frictionless such that all motion is transferred one-to-one; that is, if the first plurality of belts 116 is rotating at a speed $N_1$ and the second plurality of belts 118 is locating at a speed $N_2$, then the first plurality of balls 112 may also rotate at a speed $N_1$ and the second plurality of balls 114 may also rotate at a speed $N_2$. However, in other embodiments, there may be friction between the balls 112, 114 and the belts 116, 118 or other factors that cause a loss of motion (e.g., the first plurality of belts 116 rotate at a speed $N_1$ while the first plurality of balls 112 rotate at a speed $N_1$-$N_F$, where $N_F$ is motion lost due to friction).

Figure 2B:
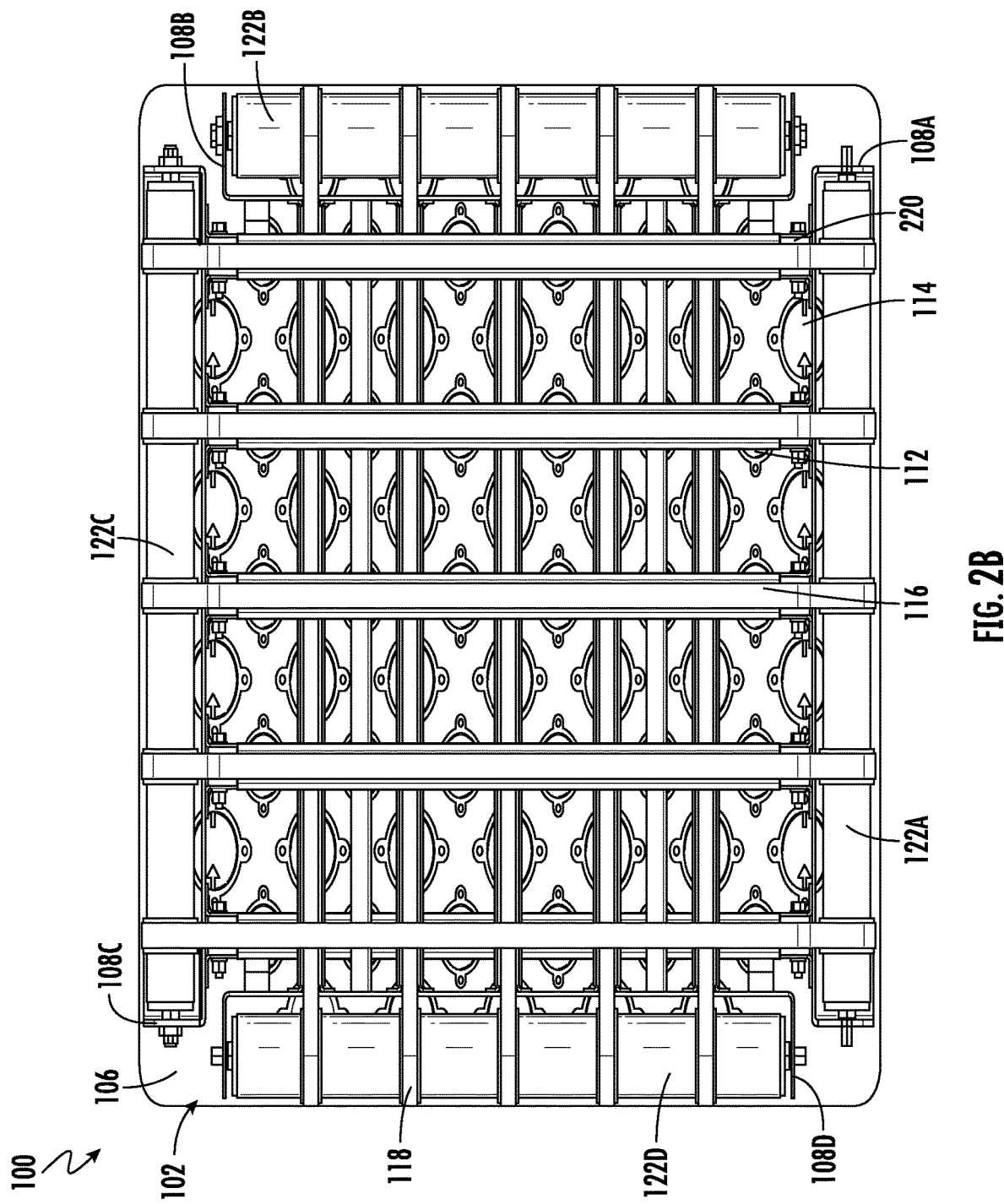
FIG. 2B is a bottom plan view of an example transfer apparatus in accordance with various embodiments of the present disclosure.
Figure 3A:
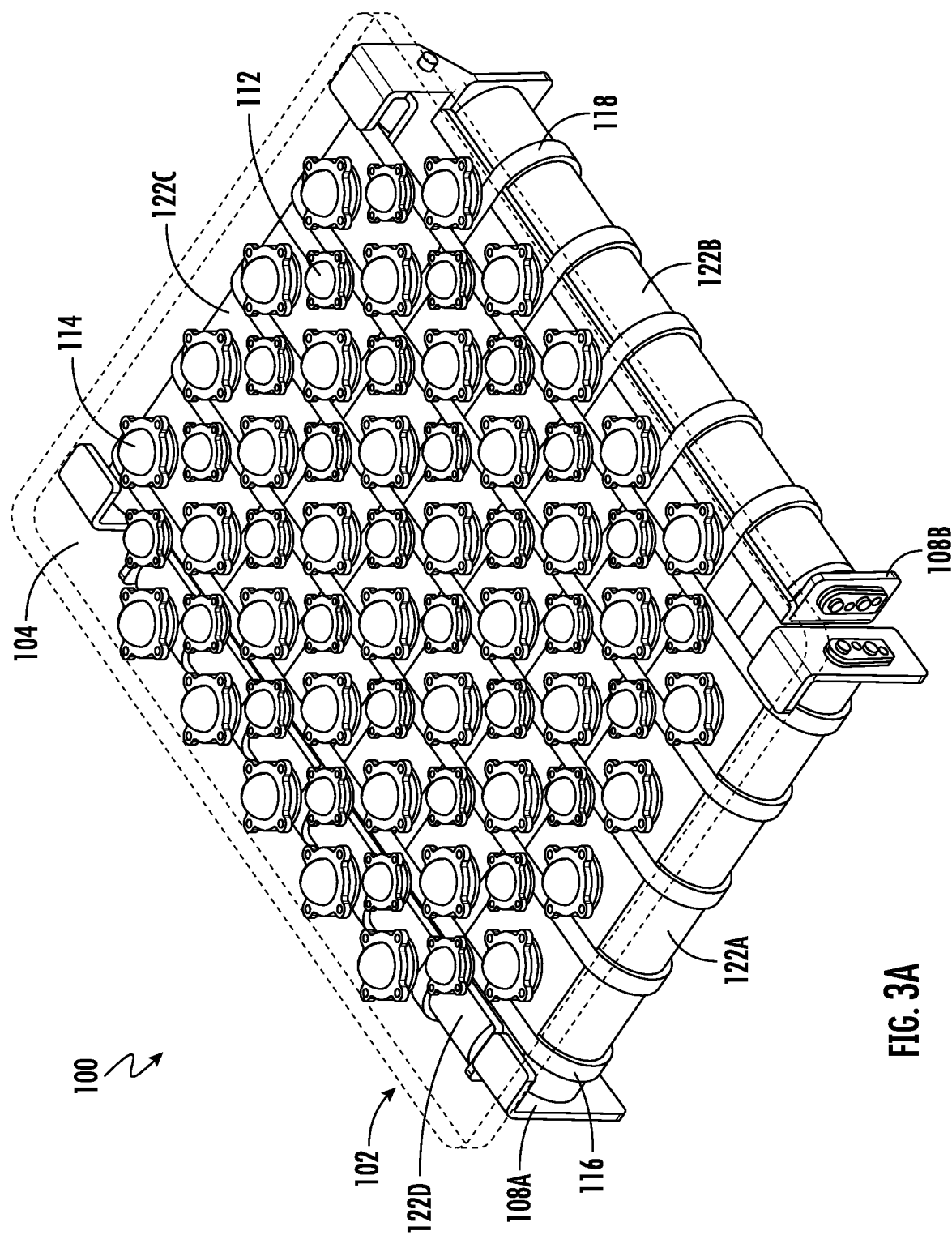
FIG. 3A is top perspective view of an example transfer apparatus in accordance with various embodiments of the present disclosure.
Figure 3B:
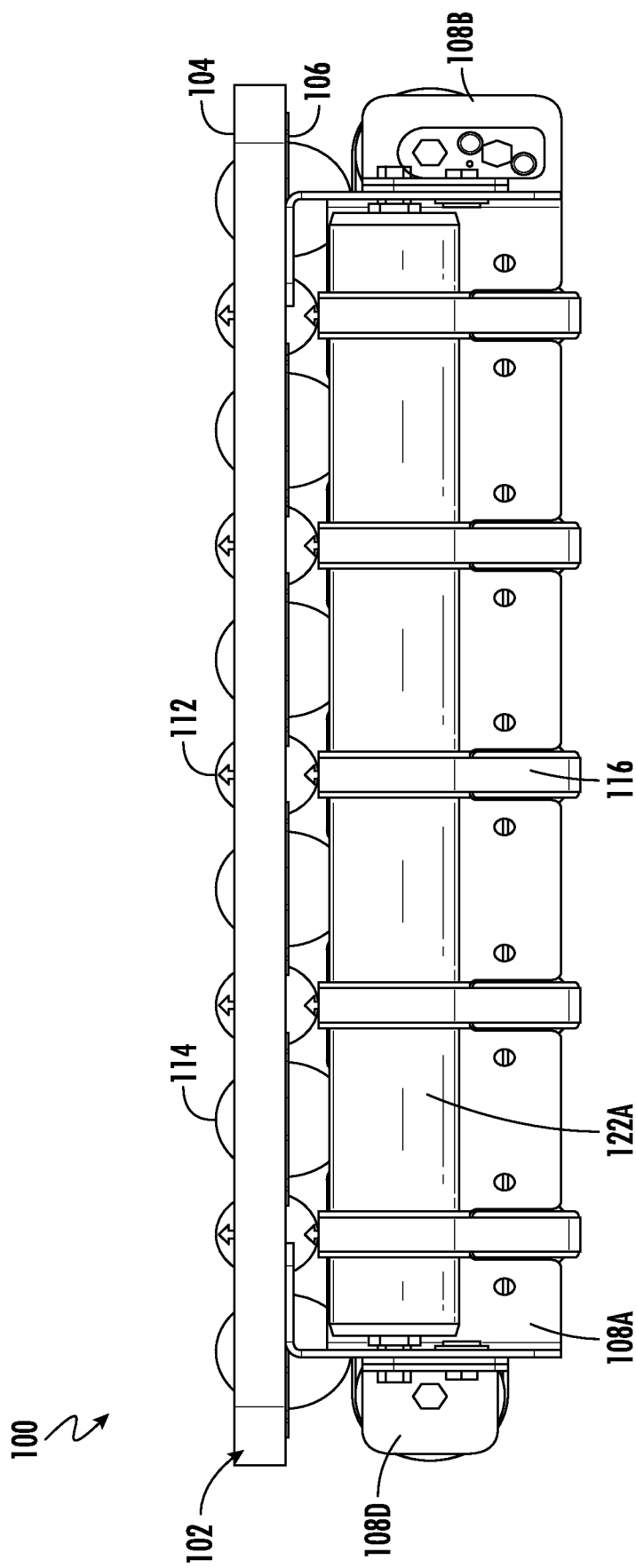
FIG. 3B is a side elevation view of an example transfer apparatus in accordance with various embodiments of the present disclosure.
Figure 3C:
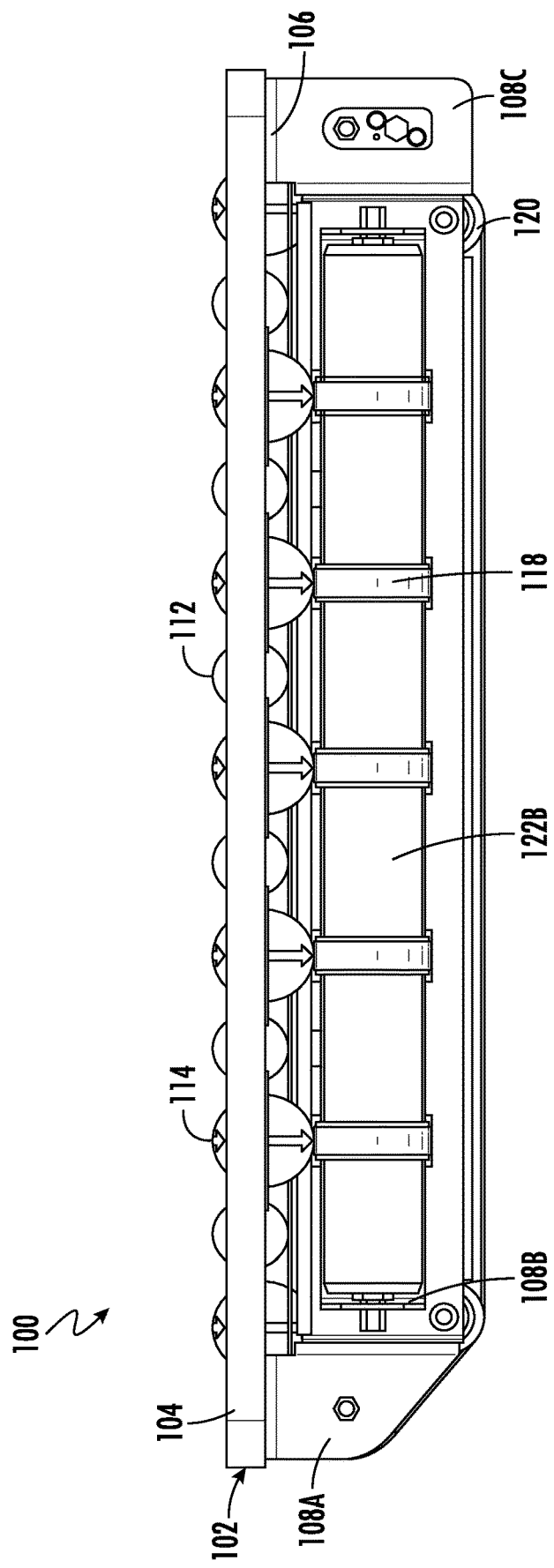
FIG. 3C is a side elevation view of an example transfer apparatus in accordance with various embodiments of the present disclosure.
Figure 4A:
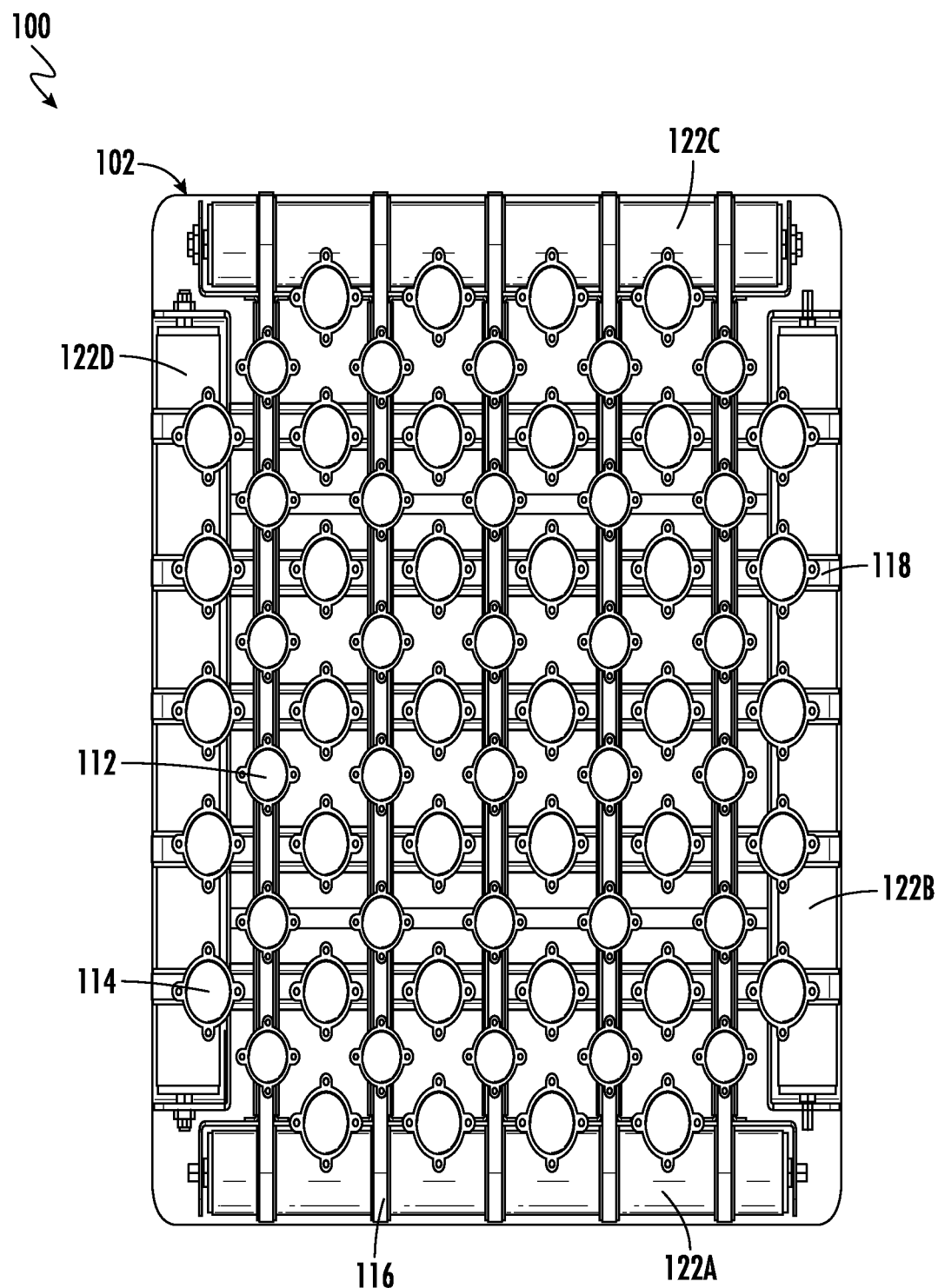
FIG. 4A is a top plan view of an example transfer apparatus in accordance with various embodiments of the present disclosure.
Figure 4B:
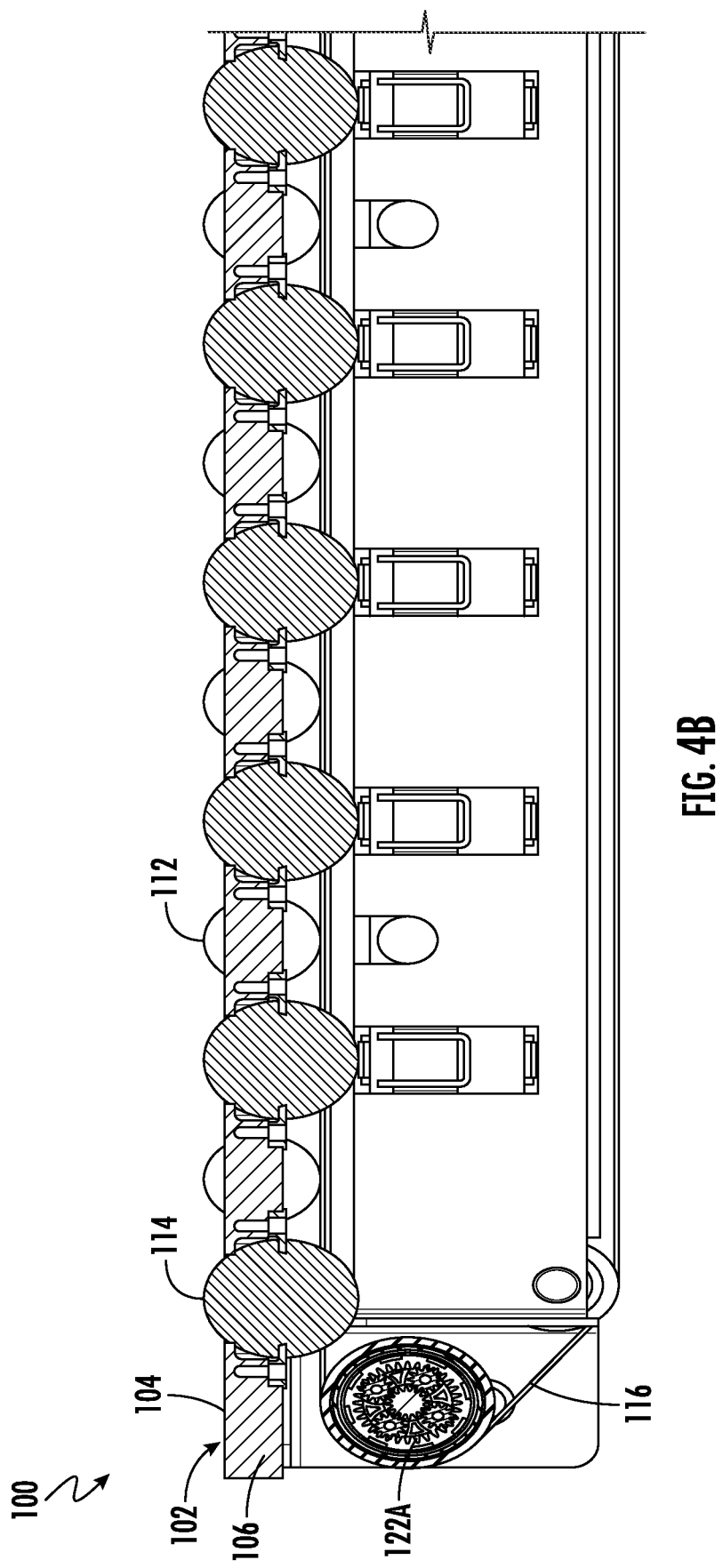
FIG. 4B is a side, elevation, cutaway view of an example transfer apparatus in accordance with various embodiments of the present disclosure.
Figure 4C:
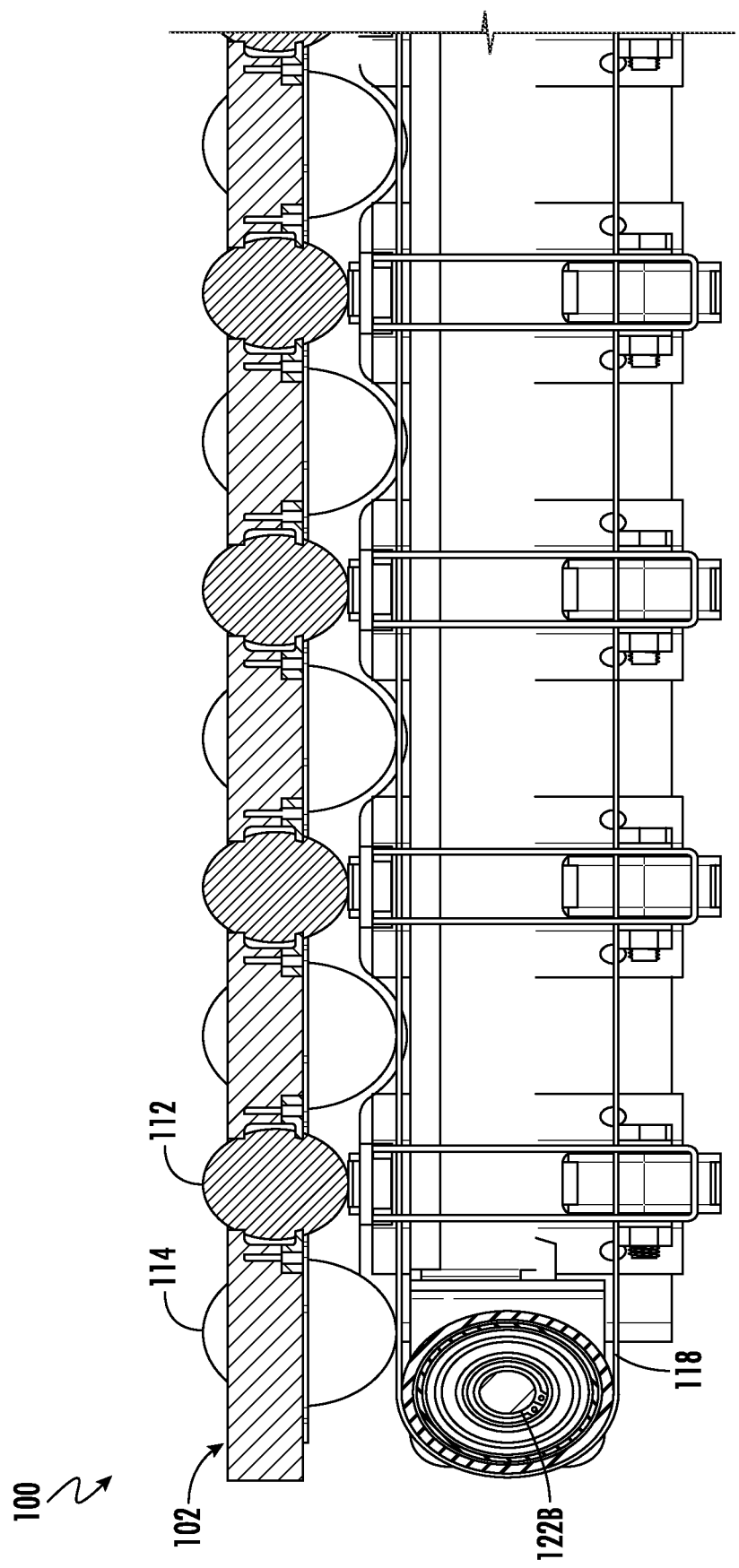
FIG. 4C is a side, elevation, cutaway view of an example transfer apparatus in accordance with various embodiments of the present disclosure.

In some embodiments, the transfer apparatus may include a plurality of pulleys 120. In some embodiments, and as shown in at least FIGS. 2A and 2B, the plurality of pulleys 120 may be operably engaged with the first plurality of belts 116. However, in other embodiments, the plurality of pulleys 120 may be operably engaged with the second plurality of belts 118 or with both the first and second plurality of belts 116, 118 simultaneously. In some embodiments, one or more of the plurality of pulleys 120 may be one or more idler rollers.

In some embodiments, the plurality of pulleys 120 may include one or more mechanisms configured to cause the plurality of pulleys 120 to adjust the tension with which the first and/or second plurality of belts 116, 118 are operably engaged with the first plurality of balls 112 and/or the second plurality of balls 114. In some embodiments, the one or more mechanisms may be configured to adjust whether the first plurality of belts 116 and/or the second plurality of belts 118 are engaged at all with the first plurality of balls 112 and/or the second plurality of balls 114. In some embodiments, these mechanisms may cause the first plurality of belts 116 to disengage from the first plurality of balls 112, such that the first plurality of belts 116 no longer transfer motion to the first plurality of balls 112. In at least this way, only one plurality of balls will be rotated.

Figure 5B:
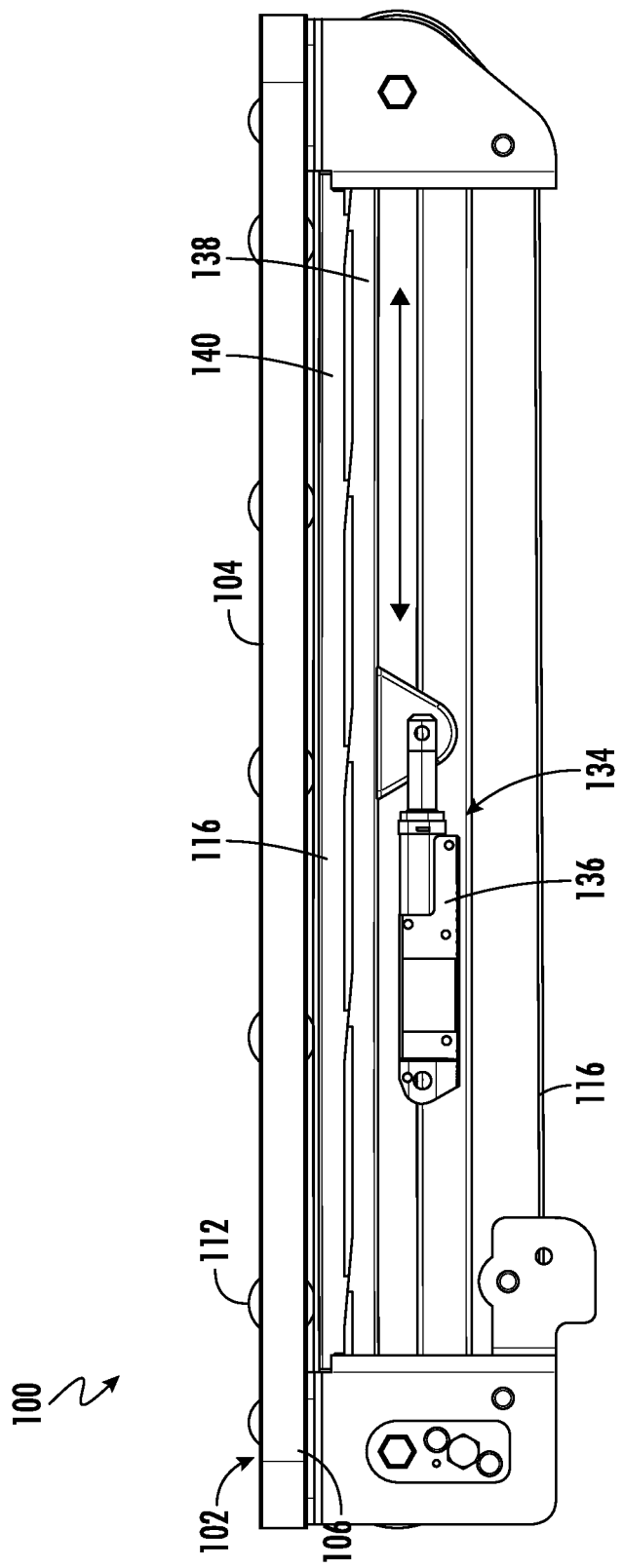
FIG. 5B is a side elevation view of an example transfer apparatus including an example sliding wedge mechanism in accordance with various embodiments of the present disclosure.

In some embodiments, and as shown in at least FIGS. 5A and 5B, the one or more mechanisms previously described may be a sliding wedge mechanism 134. In some embodiments, the sliding wedge mechanism 134 may be disposed beneath the bottom surface 106 of the bed 102. In some embodiments, the sliding wedge mechanism 134 may include an actuator 136, which in some embodiments may be a linear actuator 136. In some embodiments, the actuator 136 may be operably engaged with and configured to affect motion of one of more wedge strips 138, 140. In some embodiments, the one or more wedge strips 138, 140 may be interlocking wedge strips 138, 140 with interlocking slots, grooves, and/or protrusions such that when one wedge strip (e.g., 138) is manipulated, it affects the other wedge strip (e.g., 140). In some embodiments, one or more of the wedge strips 138, 140 may be operably engaged with one or more of the first or second plurality of belts 116, 118 and configured to transfer motion from the linear actuator 136. For example, the actuator 136 may affect motion of the first wedge strip 138, which may then transfer motion to the second wedge strip 140 and subsequently affect motion of at least one belt of the first plurality of belts 116. In another example, motion may be transferred to at least one belt of the second plurality of belts 118, or to at least one belt of the first and second plurality of belts 116, 18.

As shown in FIG. 5A, the at least one belt of the first plurality of belts 116 is not operably engaged with the one or more balls of the first plurality of balls 112. As shown in FIG. 5B, the actuator 136 may drive the wedge strips 138, 140 linearly along the arrows as shown in FIG. 5B and thereby bring the at least one belt of the first plurality of belts 116 into contact with the one or more balls of the first plurality of balls 112. In at least this way, and as previously described, the sliding wedge mechanism 134 may configure whether motion is transferred from the at least one belt of the first plurality of belts 116 to the one or more balls of the first plurality of balls 112 (as in FIG. 5B), or not transferred from the at least one belt of the first plurality of belts 116 to the one or more balls of the first plurality of balls 112 (as in FIG. 5A).

Figure 6A:
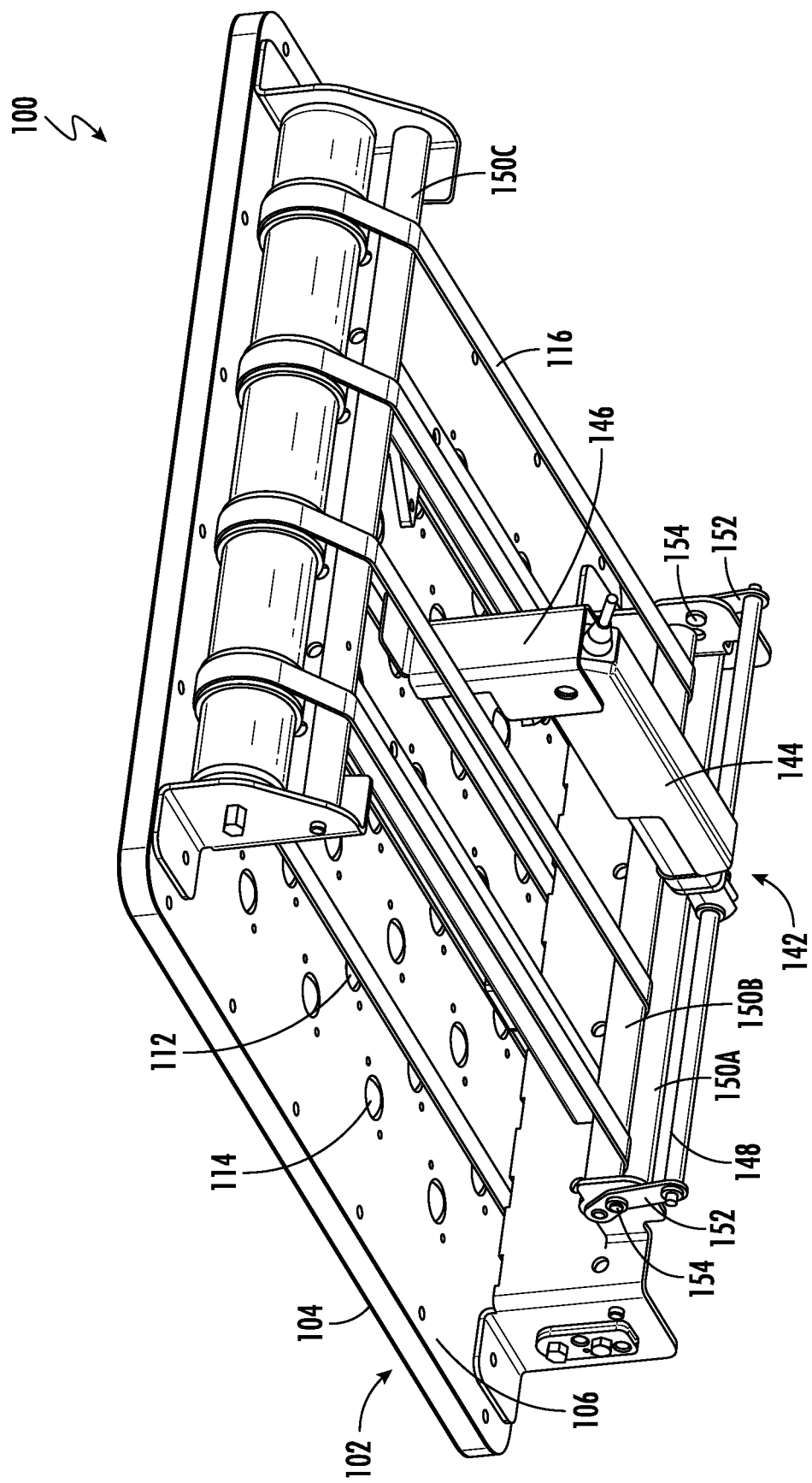
FIG. 6A is a bottom perspective view of an example transfer apparatus including an example belt tensioning mechanism in accordance with various embodiments of the present disclosure.
Figure 6C:
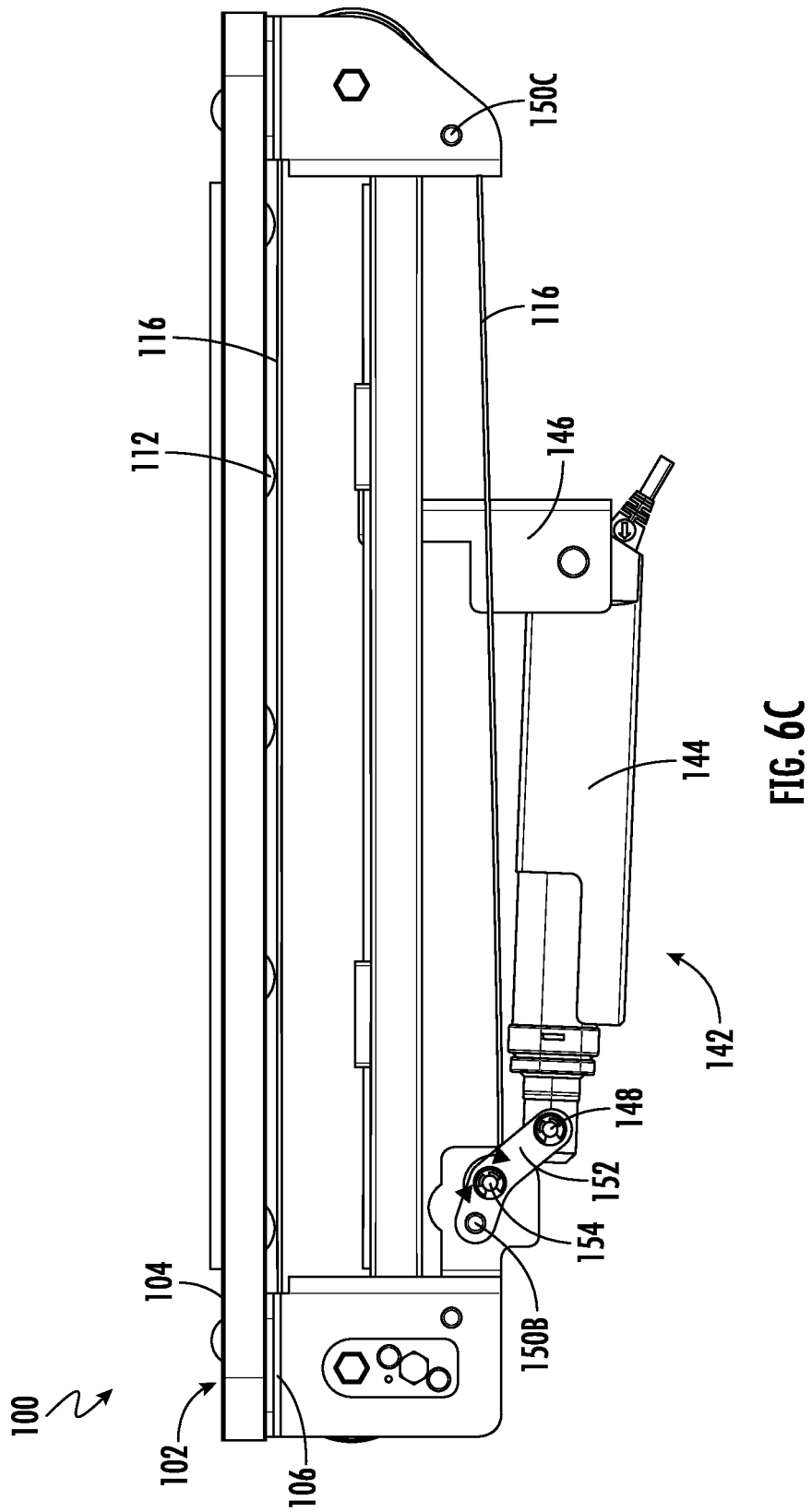
FIG. 6C is a side elevation view of an example transfer apparatus including an example belt tensioning mechanism in accordance with various embodiments of the present disclosure.

In some embodiments, and as shown in at least FIGS. 6A-6C, the one or more mechanisms previously described may be a belt tensioning mechanism 142. In some embodiments, the belt tensioning mechanism 142 may be disposed below the bottom surface 106 of the bed 102. In some embodiments, the belt tensioning mechanisms 142 may include an actuator 144, which may be a linear actuator 144 and may function similarly to the actuator 136, as previously described. In some embodiments, the actuator 144 may be connected to the bed 102 by an actuator bracketing 146. In some embodiments, the actuator 144 may be coupled to a connecting rod 148. In some embodiments, the belt tensioning mechanism 142 may include one or more tension rollers 150A, 150B, 150C, which may be operably engaged with one or more belts of the first plurality of belts 116.

In some embodiments, the belt tensioning mechanism 142 may include one or more a connecting levers 152 configured to operably connect the connecting rod 148 to one or more of the tension rollers 150A-C. In some embodiments, the one or more connecting levers 152 may be configured to rotate (as indicated by the arrows) about one or more pivot points 154. In some embodiments, the connecting levers 152 may be configured to move from a first position, as shown in FIG. 6B, where at least one belt of the first plurality of belts 116 is in contact with one or more balls of the first plurality of balls 112 and a second position, as shown in FIG. 6B, where at least one belt of the first plurality of belts 116 is not in contact with one or more balls of the first plurality of balls 112. In some embodiments, the belt tensioning mechanism 142 may perform a similar function but for at least one belt of the second plurality of belts 118 and one or more balls of the second plurality of balls 114. In some embodiments, more than one transfer mechanism 144 may be utilized for both the first and second plurality of belts 116, 118 and the first and second plurality of balls 112, 114.

In some embodiments, the transfer apparatus 100 may include one or more drivers 122A, 122B, 122C, and 122D. In some embodiments, one or more drivers 122A-D may be driven while one or more drivers 122A-D may be idlers driven by the other drivers (e.g., driver 122A may be a driver while 122C is an idler). In some embodiments, there may be a first driver 122A operably attached to the first plurality of belts 116 and a second driver 122B operably attached to the second plurality of belts 118. In some embodiments, the first driver 122A may be operably connected (by means of the first plurality of belts 116) to a third driver (e.g., 122C) that may be an idler, and the second driver 122B may be operably connected (by means of the second plurality of belts 118) to a fourth driver (e.g., 122D) that may be an idler. In some embodiments, the drivers 122A-D may be motor-driven rollers. In some embodiments, the drivers 122A-D may be fixedly attached to the bracketing 108A-D (e.g., driver 122A fixedly attached to 108A, driver 122B fixedly attached to 110A, etc.) and positioned below the bottom surface 106 of the bed 102.

Figure 8:
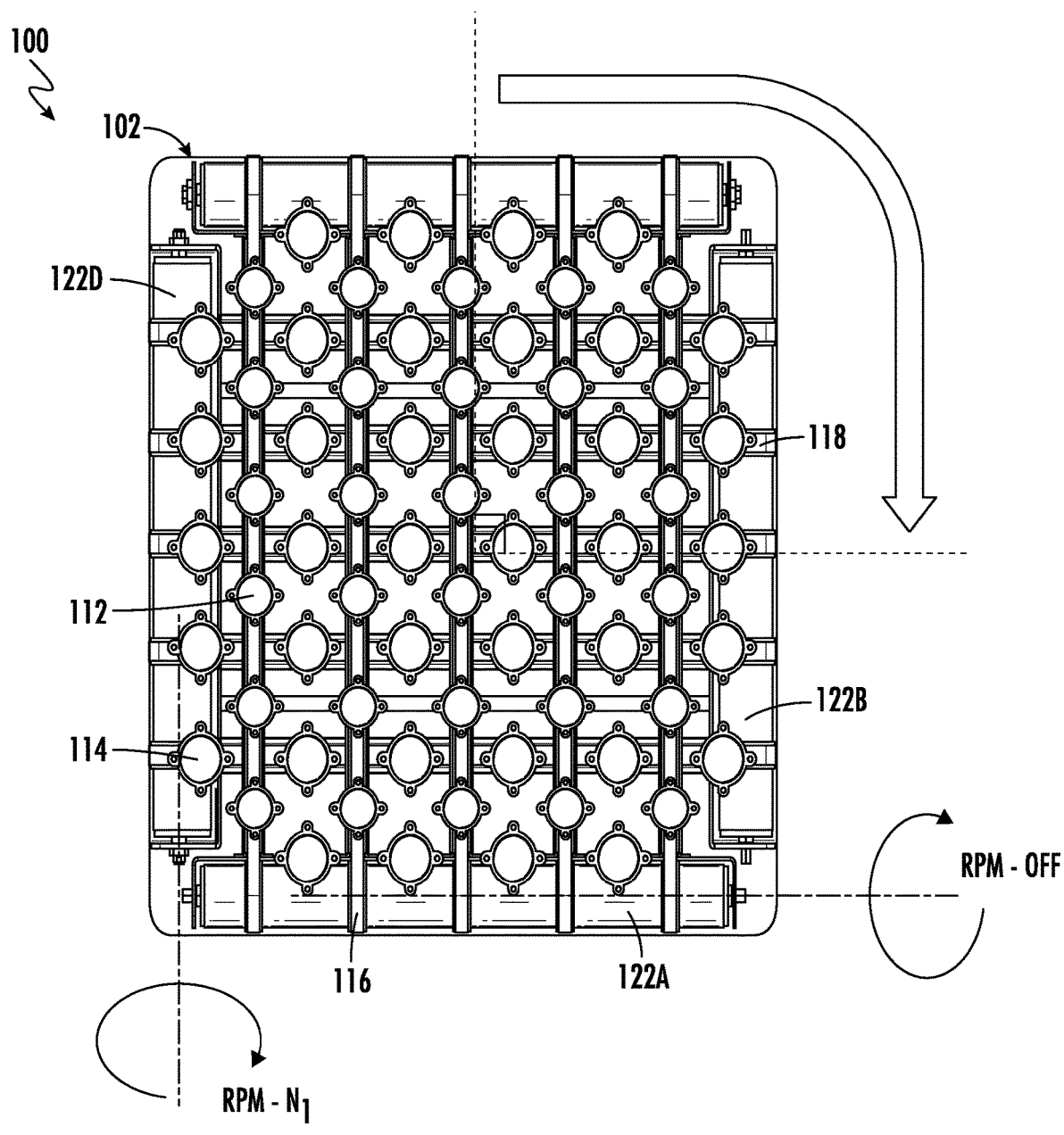
FIG. 8 is a top plan view of an example transfer apparatus in accordance with various embodiments of the present disclosure.

In some embodiments, the drivers 122A-D may be configured to drive the first and second plurality of belts 116, 118 and thereby cause the first and second plurality of balls 112, 114 to rotate. In some embodiments, the first driver 122A may be configured to drive the first plurality of belts 116, which are engaged with the first plurality of balls 112; and the second driver 122B may be configured to drive the second plurality of belts 118, which are engaged with the second plurality of balls 114. As shown in at least FIG. 8, the first driver 122A may be rotated at a speed $N_1$ while the second driver 122B may be rotated at a speed $N_2$. As shown in FIG. 8, the first driver 122A may be held stationary while the second driver 122B may be rotated at the speed $N_1$.

Example Transfer Systems

Figure 9:
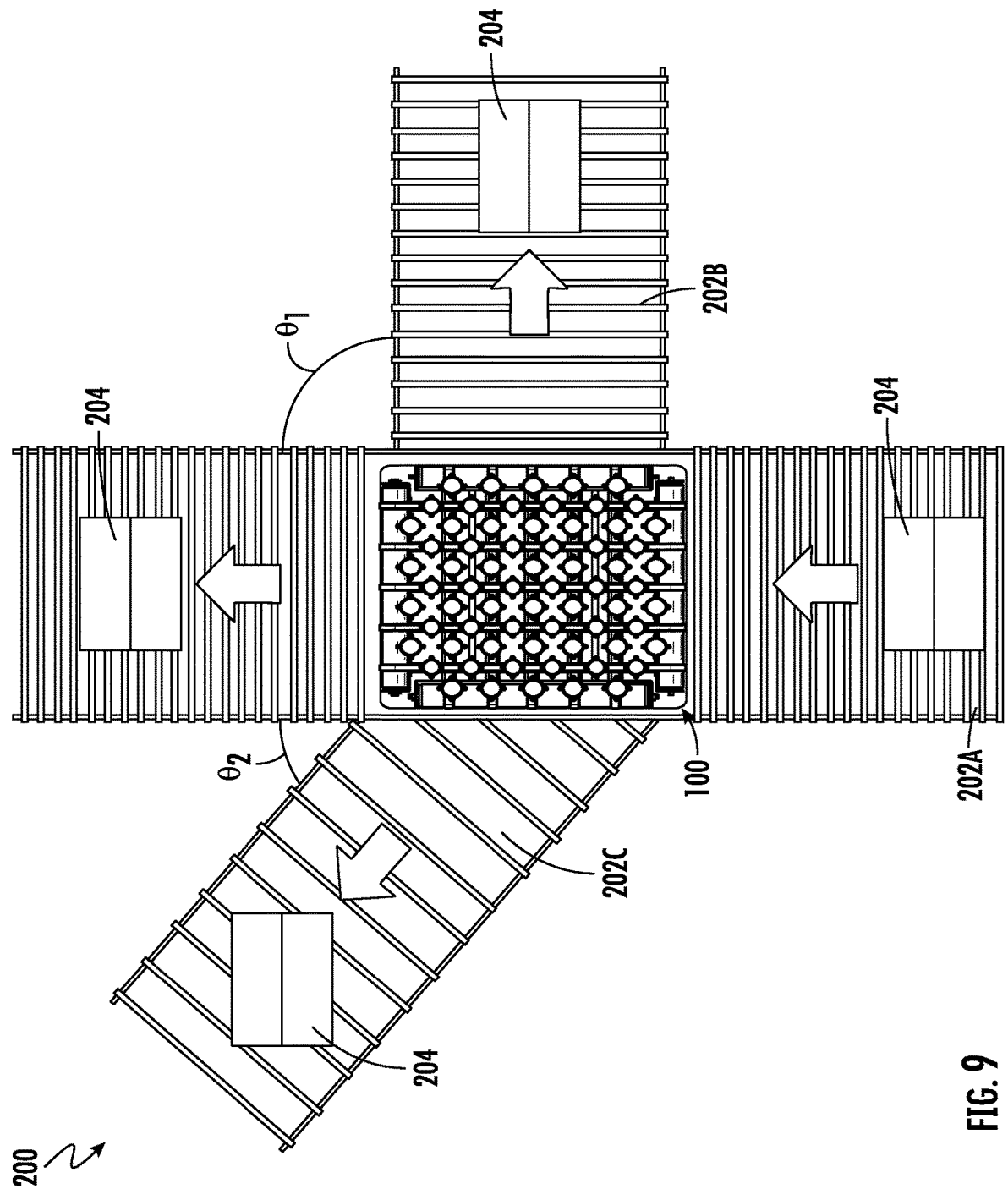
FIG. 9 is a top plan view of an example transfer system in accordance with various embodiments of the present disclosure.

FIG. 9 shows an example transfer system 200 implementing an example transfer apparatus 100 as previously described in this disclosure. In some embodiments, the transfer system 200 may include one or more conveyors 202. In some embodiments, one or more objects 204 may be supported by and transported by the one or more conveyors 202 of the system 200.

In some embodiments, the transfer system 200 may include a first conveyor 202A that travels in a first direction as indicated by the arrows and a second conveyor 202B that travels in a second direction at a first angle $\theta_1$ to the first conveyor 202A. In some embodiments, the system 200 may include a third conveyor 202C that travels in a third direction at a second angle $\theta_2$ to the first conveyor 202A. In some embodiments, $\theta_1$ may be 45 degrees. In some embodiments, $\theta_2$ may be a thirty degree angle. However, both $\theta_1$ and $\theta_2$ may each range between 0 and 90 degrees. It will be understood that various configurations of conveyors 202 disposed at various angles to each other may be embodied with a system 200.

Figure 7:
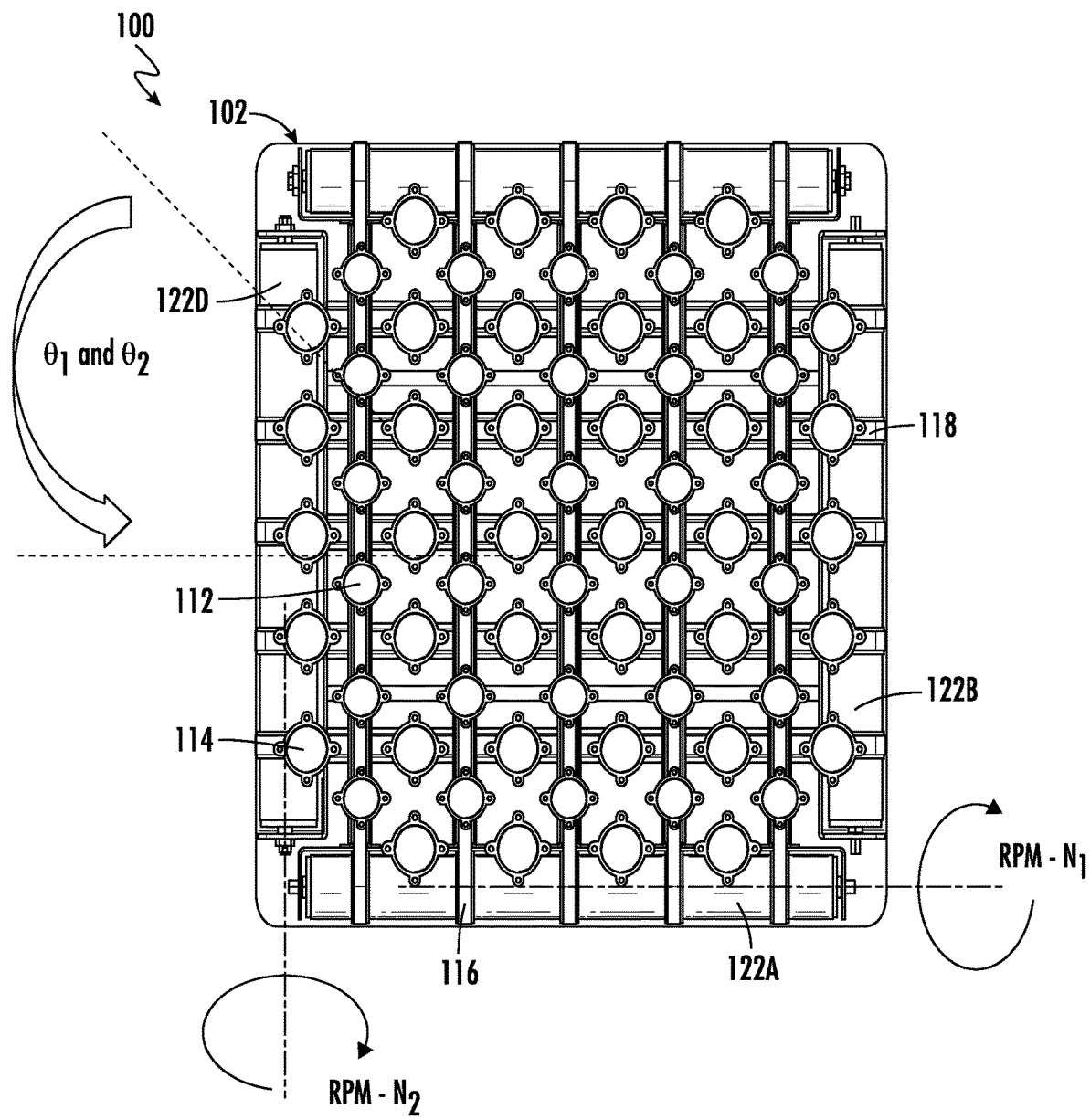
FIG. 7 is a top plan view of an example transfer apparatus in accordance with various embodiments of the present disclosure.

The system 200 may move the one or more objects 204 along the various flow paths by manipulating the power of the drivers 122A-D, which will thereby change the respective speeds at which the first and second plurality of balls 112, 114 operate. For example, referring to FIG. 10, the one or more objects 204 may be diverted to traveling along the second conveyor 202B when the first plurality of balls 112 are not rotating (e.g., because the pulleys 120 have loosened the tension on the first plurality of belts 116 such that the first plurality of balls 112 do not receive motion transfer from the first plurality of belts 116) and the second plurality of balls 114 are rotating. This may be achieved by depowering the first driver 122A and powering the second driver 122B. In this configuration, the first plurality of balls 112 will not rotate while the second plurality of balls 114 will rotate perpendicular to the first conveyor 202A. The one or more objects 204 will then be moved by transfer apparatus 100 onto the second conveyor 202B. As another example, referring still to FIG. 7, the first and second drivers 122A and 122B may each be powered at approximately equal levels (causing the first and second plurality of balls 112, 114 to rotate at approximately the same speed), which will cause the one or more objects 204 to be diverted along to the third conveyor 202C.

In some embodiments, the system 200 may include a controller that may remotely control one or more drivers 122A-D of the apparatus 100. As previously described, the first and second plurality of balls 112, 114 may be selectively controlled to move one or more objects 204 traveling along the system 200. According to various embodiments, the first plurality and second plurality of balls 112, 114 may be controlled manually and remotely by a technician operating the system 200. In other embodiments, the first and second plurality of balls 112, 114 may be controlled automatically, and the apparatus 100 may be configured to engage the one or more objects 204 at predetermined times to move the one or more objects 204 throughout the system 200.

Example Methods of Use for Transfer Systems

Figure 10:
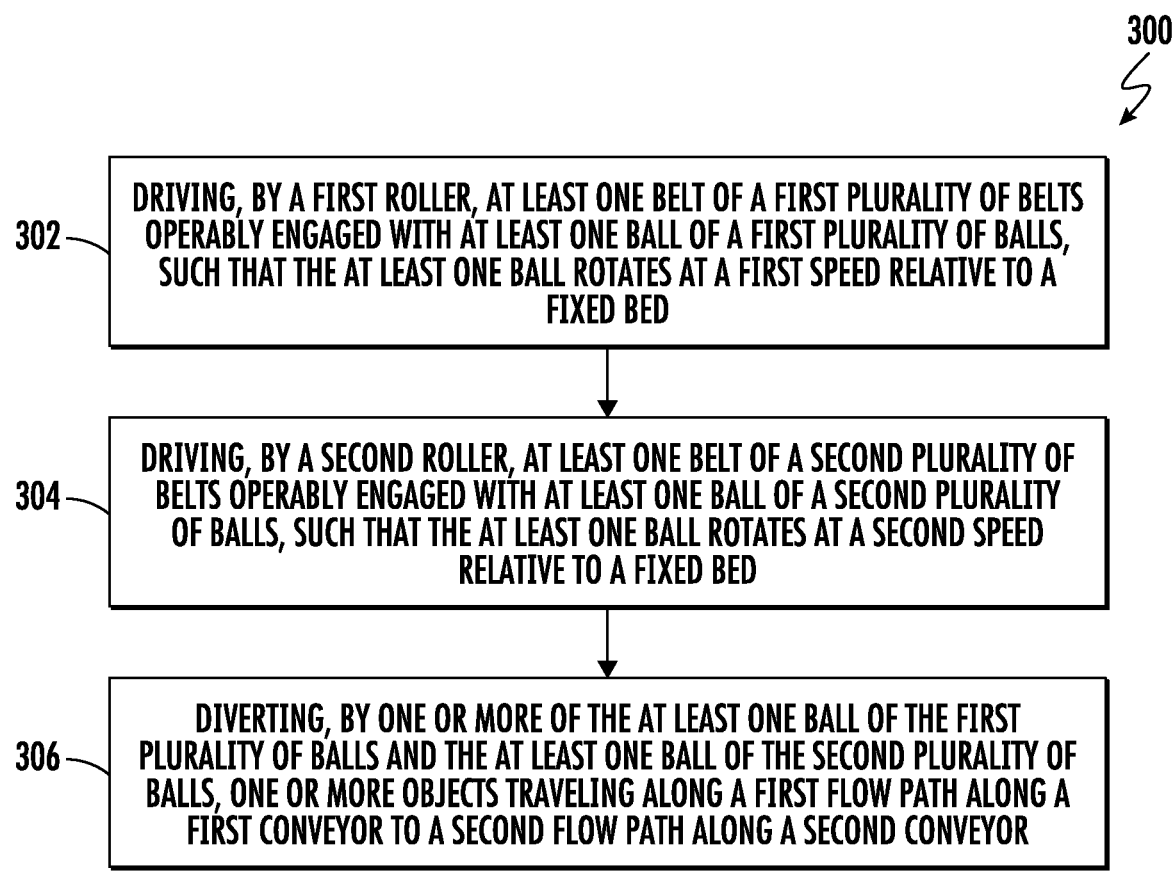
FIG. 10 is an example flow chart for an example method of use for an example transfer system in accordance with various embodiments of the present disclosure.

FIG. 10 is an example flow chart of an example method 300 of using an example transfer system. Although the method 300 is described with reference to the apparatus 100 and system 200 and their various components previously described the method 300 may be implemented on any number of suitable apparatuses and systems.

In some embodiments, the method 300 may include a step 302 of driving, by a first roller, at least one belt of a first plurality of belts operably engaged with at least one ball of a first plurality of balls, such that the at least one ball rotates at a first speed relative to a fixed bed. In some embodiments, the method 300 may include a step 304 of driving, by a second roller, at least one belt of a second plurality of belts operably engaged with at least one ball of a second plurality of balls, such that the at least one ball rotates at a second speed relative to the fixed bed. In some embodiments, the method 300 may include a step 306 of diverting, by one or more of the at least one ball of the first plurality of balls and the at least one ball of the second plurality of balls, one or more objects traveling along a first flow path along a first conveyor to a second flow path along a second conveyor. In some embodiments, the method 300 may further include a step of adjusting, by at least one pulley of a plurality of pulleys operably connected to the at least one belt of the first plurality of belts, a tension of the at least one belt of the first plurality of belts.

Many modifications and other embodiments of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A transfer apparatus comprising:
a bed comprising:
  a first plurality of balls, each ball of the first plurality of balls comprising a first diameter, wherein at least one ball of the first plurality of balls is configured to rotate relative to the bed;
  a second plurality of balls, each ball of the second plurality of balls comprising a second diameter, wherein at least one ball of the second plurality of balls is configured to rotate relative to the bed;
a plurality of belts, wherein at least one belt of the plurality of belts is operably engaged with the at least one ball of the first plurality of balls or the at least one ball of the second plurality of balls;
a driver operably connected to the at least one belt of the plurality of belts, wherein the driver is configured to power the at least one belt of the plurality of belts; and
a plurality of pulleys, wherein the plurality of pulleys comprises a mechanism configured to adjust a tension of the at least one belt such that the at least one belt moves between a first position and a second position, wherein, in the first position, the at least one belt is engaged with the at least one ball of the first plurality of balls, and wherein, in the second position, the at least one belt refrains from engagement with the at least one ball of the first plurality of balls.

2. The transfer apparatus of claim 1, wherein the driver is a motor-driven roller.

3. The transfer apparatus of claim 1, wherein the at least one belt of the plurality of belts comprises an elastomer strip belt and the at least one ball of the first plurality of balls comprises a plastic ball.

4. The transfer apparatus of claim 1, wherein the second diameter is greater than the first diameter.

5. The transfer apparatus of claim 1, wherein the at least one ball comprises a modular cartridge comprising:
a top race;
a bottom race;
a transfer ball; and
one or more balls for low friction movement,
wherein the top race and the bottom race are configured to fixedly attach and enclose the transfer ball such that the transfer ball is configured to rotate within a pocket formed by the top race and the bottom race, and
wherein the one or more balls for low friction movement are configured to be operably engaged with the transfer ball such that the one or more balls for low friction movement reduce friction between one or more of the top race and the bottom race.

6. The transfer apparatus of claim 1, wherein at least one pulley of the plurality of pulleys is operably engaged with the at least one belt of the plurality of belts.

7. The transfer apparatus of claim 1, wherein the mechanism comprises a sliding wedge mechanism comprising:
an actuator; and
one or more wedge strips,
wherein the actuator is operably engaged with the one or more wedge strips and the one or more wedge strips are operably engaged with the at least one belt of the plurality of belts, and
wherein the actuator is configured to drive the one or more wedge strips such that the one or more wedge strips move the at least one belt between the first position and the second position.

8. The transfer apparatus of claim 1, wherein the mechanism comprises a belt tensioning mechanism comprising:
an actuator;
one or more tension rollers; and
a connecting lever,
wherein the actuator is operably engaged with the one or more tension rollers and the one or more tension rollers are operably engaged with the connecting lever, and wherein the connecting lever is configured to move about a pivot point such that the one or more tension rollers move the at least one belt between the first position and the second position.

9. The transfer apparatus of claim 1,
wherein the bed is a fixed bed comprising a top surface and a bottom surface,
wherein the first diameter of the at least one ball of the first plurality of balls defines a first distal end located above the top surface and a first proximal end located below the bottom surface,
wherein the second diameter of the at least one ball of the second plurality of balls defines a second distal end located above the top surface and a second proximal end located below the bottom surface,
wherein the first distal end and the second distal end are located on a first, shared plane above and parallel to the top surface,
wherein the first proximal end is located on a second plane below and parallel to the bottom surface, and
wherein the second proximal end is located on a third plane below and parallel to the bottom surface.

10. The transfer apparatus of claim 1,
wherein the plurality of belts comprises a first plurality of belts aligned along a first axis,
wherein the transfer apparatus further comprises a second plurality of belts aligned along a second axis,
wherein at least one belt of the first plurality of belts is operably engaged with the at least one ball of the first plurality of balls, and
wherein at least one belt of the second plurality of belts is operably engaged with the at least one ball of the second plurality of balls.

11. The transfer apparatus of claim 10, wherein the driver comprises a first driver,
wherein the transfer apparatus further comprises a second driver operably connected to the at least one belt of the second plurality of belts,
wherein the first driver is configured to power the at least one belt of the first plurality of belts, and
wherein the second driver is configured to power the at least one belt of the second plurality of belts.

12. The transfer apparatus of claim 11,
wherein the first axis is perpendicular to the second axis, and
wherein the first driver is perpendicular to the at least one belt of the first plurality of belts and the second driver is perpendicular to the at least one belt of the second plurality of belts.

13. The transfer apparatus of claim 12,
wherein the first driver is configured to drive the at least one belt of the first plurality of belts such that the at least one ball of the first plurality of balls rotates at a first speed $N_1$ and
wherein the second driver is configured to drive the at least one belt of the second plurality of belts such that the at least one ball of the second plurality of balls rotates at a second speed $N_2$.

14. The transfer apparatus of claim 13,
wherein the first driver and the second driver are configured to drive the at least one belt of the first plurality of belts and the at least one belt of the second plurality of belts such that:

$$N_1 = N_2,$$
$$N_1 > N_2, \text{ or}$$
$$N_1 < N_2.$$

15. A transfer system comprising:
a first conveyor configured to transport one or more objects in a first flow path aligned along the first conveyor;
a second conveyor configured to transport the one or more objects in a second flow path aligned along the second conveyor; and
a transfer apparatus configured to do one or more of:
divert a first flow of the one or more objects from the first flow path of the first conveyor to the second flow path of the second conveyor, or
divert a second flow of the one or more objects from the second flow path of the second conveyor to the first flow path of the first conveyor, wherein the transfer apparatus comprises:
a bed comprising:
a first plurality of balls, each ball of the first plurality of balls comprising a first diameter, wherein at least one ball of the first plurality of balls is configured to rotate relative to the bed;
a second plurality of balls, each ball of the second plurality of balls comprising a second diameter, wherein at least one ball of the second plurality of balls is configured to rotate relative to the bed;
a plurality of belts, wherein at least one belt of the plurality of belts is operably engaged with the at least one ball of the first plurality of balls or the at least one ball of the second plurality of balls; and
a driver operably connected to the at least one belt of the plurality of belts, wherein the driver is configured to power the at least one belt of the plurality of belts; and
a plurality of pulleys, wherein the plurality of pulleys comprises a mechanism configured to adjust a tension of the at least one belt such that the at least one belt moves between a first position and a second position, wherein, in the first position, the at least one belt is engaged with the at least one ball of the first plurality of balls, and wherein, in the second position, the at least one belt refrains from engagement with the at least one ball of the first plurality of balls.

16. The transfer system of claim 15, wherein the first flow path and the second flow path define an angle between them, the angle ranging between 15 and 45 degrees.

17. The transfer system of claim 15, further comprising a third conveyor configured to transport the one or more objects in a third flow path aligned along the third conveyor.

18. The transfer system of claim 17,
wherein the first flow path and the second flow path define a first angle between them, the first angle ranging between 15 and 45 degrees, and
wherein the first flow path and the third flow path define a second angle between them, the second angle ranging between 45 and 90 degrees.

\* \* \* \* \*